US006167084A

United States Patent [19]
Wang et al.

[11] Patent Number: 6,167,084
[45] Date of Patent: Dec. 26, 2000

[54] DYNAMIC BIT ALLOCATION FOR STATISTICAL MULTIPLEXING OF COMPRESSED AND UNCOMPRESSED DIGITAL VIDEO SIGNALS

[75] Inventors: Limin Wang; Ajay Luthra, both of San Diego, Calif.

[73] Assignees: Motorola, Inc., Schaumburg, Ill.; General Instrument Corporation, Horsham, Pa.

[21] Appl. No.: 09/141,265

[22] Filed: Aug. 27, 1998

[51] Int. Cl.[7] .................................................. H04N 7/58
[52] U.S. Cl. ......................................... 375/240.02
[58] Field of Search .............................. 375/240, 240.01, 375/240.02; 348/384, 385, 388, 390, 420; 382/232, 233; H04N 7/58

[56] References Cited

U.S. PATENT DOCUMENTS

| 5,216,503 | 6/1993 | Paik et al. ................................. | 348/390 |
| 5,617,142 | 4/1997 | Hamilton ................................. | 348/405 |
| 5,805,220 | 9/1998 | Keesman ................................. | 348/385 |
| 6,038,256 | 3/2000 | Linzer ...................................... | 348/385 |

FOREIGN PATENT DOCUMENTS

| 0 759 667 | 2/1997 | European Pat. Off. . |
| 0 784 409 | 7/1997 | European Pat. Off. . |
| WO 95/32565 | 11/1995 | WIPO . |
| WO 97/47128 | 12/1997 | WIPO . |

OTHER PUBLICATIONS

L. Wang and A. Vincent, "Bit Allocation for Joint Coding of Multiple Video Programs," SPIE Visual Communications and Image Processing, pp. 149–158, Feb. 1997.
L. Wang and A. Vincent, "Joint Rate Control for Multi-Program Video Coding," IEEE Transactions on Consumer Electronics, vol. 42, No. 3, pp. 300–305, Aug. 1996.

*Primary Examiner*—Howard Britton
*Attorney, Agent, or Firm*—Barry R. Lipsitz

[57] ABSTRACT

The present invention relates to a method and apparatus for allocating bits in a statistical multiplexing system (stat mux). A statistical multiplexer (stat mux) accommodates both compressed and uncompressed video programs using transcoding and encoding, respectively. Hierarchical dynamic bit allocation is used, starting from a super GOP level, then to a super frame level, and then to the regular (individual) frame level. At each level, a target number of bits is determined. A target number of bits for a super frame, which is a collection of frames across all channels at a given frame instance, is adaptive and is able to address any combination of picture types. Frames of the same picture type for a program are generally assigned the same (or similar) number of bits. Relative program quality can be controlled using a program priority weighting factor. Additionally, constraints on target bit rates and minimum and maximum bit rates are provided.

18 Claims, 11 Drawing Sheets

DYNAMIC BIT ALLOCATION FOR STATISTICAL MULTIPLEXING OF COMPRESSED AND UNCOMPRESSED DIGITAL VIDEO SIGNALS

BACKGROUND OF THE INVENTION

The present invention relates to a method and apparatus for allocating bits in a statistical multiplexing system. In particular, an architecture is disclosed for Statistical Multiplexing (stat mux) of both compressed and uncompressed video signals. Dynamic bit allocation and rate control are provided. Additionally, upper and lower program bit rates boundaries are specified to prevent the encoder and decoder buffers from overflowing or underflowing.

With recent advances in digital video compression, such as used in the MPEG-2 standard, and digital data transmission techniques, it is possible to deliver several digitally compressed video programs in the same bandwidth presently occupied by a single analog television (TV) channel. These capabilities provide opportunities for programming service providers (e.g., broadcasters such as CNN, ABC), network operators (e.g., cable and satellite network owners), and end users.

In a multi-program transmission environment, several programs (e.g., channels) are coded, multiplexed and transmitted over a single communication channel. Since these programs share a limited channel capacity, the aggregate bit rate of the programs must be no greater than the communication channel rate. This can be achieved by controlling either each individual program bit rate using independent coding, or the aggregate bit rate using statistical multiplexing, also known as joint coding. A statistical multiplexer is referred to herein as a "stat mux", while statistical multiplexing is referred to as "stat muxing". With independent coding, rate control can only be performed across the time and spatial dimensions of a program. However, in stat muxing or joint coding, control is extended to an additional dimension; that is, the program dimension. As a result, there is greater freedom in allocating the channel capacity among programs and therefore more control of picture quality among programs as well as within a program.

However, such systems generally process one picture at a time from each channel (e.g., at a common frame, instance), and do not account for the Group of Picture (GOP) configurations of the data streams or the picture type.

A GOP is a group of one or more consecutive pictures. A GOP may contain intra-coded pictures (I-pictures), predictive coded picture (P-pictures) and/or bi-directional predictive coded pictures (B-pictures), for example. Different channels may have different GOP lengths and configurations. A GOP can also consist of progressively refreshed pictures where there are no I-pictures. However, in a P-picture, a portion, e.g. slice, of the picture is coded as I-blocks. The location of I-blocks changes from one P-picture to another.

Moreover, video materials such as films and the like may be pre-compressed and stored for subsequent transmission. These pre-compressed video may be coded at either a constant bit rate (CBR) or a variable bit rate (VBR). This presents difficulties when the stat mux attempts to integrate the pre-compressed program bit streams with the raw, uncompressed digital video sequences.

Accordingly, it would be desirable to have a stat mux system that is able to handle pre-compressed data that is at either a constant bit rate (CBR) or variable bit rate (VBR), along with uncompressed video data.

The stat mux system should use the GOP structure of the video channels to provide an efficient bit allocation technique.

The stat mux system should further account for the picture type in each GOP in allocating bits.

The stat mux system should assign the same, or similar, number of bits to frames of the same picture type for continuous scenes.

The stat mux system should further account for a relative priority of the channels, as well as the complexity level of each frame.

The stat mux system should be compatible with existing digital video standards such as MPEG-2.

The stat mux system should prevent encoder or decoder buffer overflow or underflow.

The stat mux system should provide constraints on target bit rates, including constraints on overall minimum and maximum bit rates.

Furthermore, for super GOP and super frame bit allocation schemes, the stat mux system should provide target bit rates, and constraints on the target bit rates, for super GOPS, super frames, and regular frames, as well as constraints on overall minimum and maximum bit rates.

The present invention provides a system having the above and other advantages.

SUMMARY OF THE INVENTION

The present invention relates to a method and apparatus for allocating bits in a stat mux system.

The invention provides a stat mux that accommodates both pre-compressed and uncompressed video programs using transcoding and encoding, respectively.

Additionally, hierarchical dynamic bit allocation is used, starting from a super GOP level, then to a super frame level, and then to the regular (individual) frame level. The concept can be further extended to a sub-frame level, where bits are allocated for a portion of a frame such as a slice, or for a video object plane (VOP) as described in the MPEG-4 standard, for example. At each hierarchical layer, a target number of bits is determined.

A target number of bits ($T_n$) for a super frame n, which is a collection of frames across all channels at a given frame instance n, is adaptive and accounts for any combination of picture types. Moreover, although it is not necessary, it is desirable that frames of the same picture type for a program (for continuous scenes) are assigned the same (or similar) number of bits. To achieve this adaptation in bit allocation, the invention provides a dynamic bit allocation strategy that determines a target number of bits for each program on a frame-by-frame basis according to the previous coding information, such as quantization parameters used, and the resulting number of bits.

Furthermore, to prevent both encoder and decoder buffers from overflowing or underflowing, constraints are imposed on the compressed bit rate of each program in the multi-program transmission environment.

Additionally, program quality can be controlled during stat muxing according to a program priority weighting factor.

Furthermore, target bit rates, and constraints on the target bit rates, are provided for super GOPS, super frames, and regular frames. Constraints on overall minimum and maximum bit rates are also provided.

A particular bit allocation method for digital video in accordance with the present invention processes a plurality L of video programs (e.g., channels) at an encoder, where each program has successive groups of pictures (GOPs). Each group of pictures has an associated number of pictures, typically 10–20. The term "picture" refers to a frame or a field. A "super group of pictures" is provided comprising at least one group of pictures from each of the L video programs, and having a length of N pictures.

A first target number of bits, T, is calculated for encoding the super group of pictures according to the number of pictures in the super group of pictures, L×N, and an available capacity of a channel over which the video programs are transmitted, such as a cable television network or satellite broadcast network. Furthermore, each super group of pictures comprises a plurality N of "super frames", each super frame having L pictures at a common temporal reference point.

A second target number of bits, $T_n$, is calculated for encoding each $n^{th}$ super frame of pictures, where n=1, ..., N, according to the first target number of bits, T, and a complexity measure of each $l^{th}$ picture in the associated $n^{th}$ super frame, where l=1, ..., L.

A third target number of bits, $T_{l,n}$, is calculated for encoding each $l^{th}$ picture in the associated $n^{th}$ super frame according to the second target number of bits and the associated complexity measure, and in inverse proportion to a sum of the complexity measures for each picture in the associated $n^{th}$ super frame.

The length N of the super GOP is preferably a least common multiple of the associated number of pictures in each of the groups of pictures. For example, the least common multiple for GOPs with respective lengths of nine and fifteen frames is forty-five.

When different picture types are provided in at least one of the group of pictures, the method comprises the further steps of: providing respective different weighting factors K for the different picture types; and calculating the third target number of bits for encoding each $l^{th}$ picture in the associated $n^{th}$ super frame according to the respective weighting factor thereof.

For example, the different picture types may include I-pictures, P-pictures and/or B-pictures.

In some case, a temporal boundary of a group of pictures of at.least one of the programs is mis-aligned with a temporal boundary of the super group of pictures such that the super group of pictures comprises a fractional portion of the mis-aligned group of pictures. But, the super GOP lengths are always multiples of program GOP lengths. The invention can be used even when the program GOPs are unsynchronized with one another and/or a super GOP.

The method may include the further steps of providing respective weighting factors, w, for the different video programs according to a relative priority thereof, and calculating the third target number of bits for encoding each $l^{th}$ picture in the associated $n^{th}$ super frame according to the respective weighting factor of the associated $l^{th}$ video program.

Preferably, the same complexity measure is used for each picture with a common picture type (e.g., I, P or B) in at least one of the video programs of the super group of pictures for calculating the second and third target numbers of bits.

In particular, the method may include the further steps of: defining respective complexity measures for each picture type in each $l^{th}$ program, and using the respective complexity measures for calculating the second and third target numbers of bits. Moreover, the respective complexity measures may be updated after encoding each picture.

The method may include the further steps of: calculating a remaining number of bits available, $T_r$, for encoding a remainder of the super frames not yet encoded in the super group of pictures after encoding the l pictures in one of the super frames, and encoding each remaining super frame not yet encoded in proportion to the remaining number of bits available, $T_r$.

A buffer associated with the encoder receives encoded data from the video programs. Accordingly, maintaining the encoder's buffer level between a minimum and maximum level is important. Thus, the method may include the further steps of adjusting the associated second target number of bits, if necessary, to avoid falling below a minimum level, $R_{channel(bpf)} - B^e_{n-1}$, prior to encoding the $n^{th}$ super frame with the associated second target number of bits. $R_{channel(bpf)}$ is an average number of bits per picture transmitted over the channel; and $B^e_{n-1}$ is a fullness level of the buffer after the previous (e.g., $(n-1)^{th}$) super frame has been encoded.

For the maximum encoder buffer level, the method may include the further step of adjusting the associated second target number of bits, if necessary, to avoid exceeding $R_{channel(bpf)} + B^e_{max} - B^e_{n-1}$, prior to encoding the $n^{th}$ super frame with the associated second target number of bits. Here, $B^e_{max}$ is a maximum capacity of the buffer.

Furthermore, the video programs are transmitted over the channel to a decoder, so it is important to maintain the decoder's buffer level within acceptable limits. Prior to encoding the $l^{th}$ picture in the $n^{th}$ super frame with the associated third target number of bits, the method may include the further step of adjusting the associated third target number of bits, if necessary, to avoid exceeding a maximum level, $$\sum_{n'=n}^{n+N'} R^c_{l,n'} - B^e_{l,n-1};$$

wherein:

$$\sum_{n'=n}^{n+N'} R^c_{l,n'}$$

is a sum of the number of bits transmitted for the $n^{th}$ through $(n+N')^{th}$ pictures for the $l^{th}$ video program;

N' is a decoding delay of the decoder; and $B^e_{l,n-1}$ is a fullness level of the buffer after the $l^{th}$ picture in the $(n-1)^{th}$ super frame has been encoded.

Prior to encoding the $l^{th}$ picture in the $n^{th}$ super frame with the associated third target number of bits, the method may include the further steps of adjusting the associated third target number of bits, if necessary, to avoid falling below a minimum level, $$\sum_{n'=n}^{n+N'} R^c_{l,n'} - B^e_{l,n-1} - B^d_{max}$$

wherein:

$$\sum_{n'=n}^{n+N'} R^c_{l,n'}$$

is a sum of the number of bits transmitted for the $n^{th}$ through $(n+N')^{th}$ pictures for the $l^{th}$ video program;

N' is a decoding delay of the decoder;

$B^e_{l,n-1}$ is a fullness level of the encoder's buffer after the $l^{th}$ picture in the n–$1^{st}$ super frame has been encoded; and $B^d_{max}$ is a maximum capacity of the decoder's buffer.

Additionally, in many cases it is desirable to maintain the bit rate for each program within predetermined limits.

For a minimum rate, the method comprises the further steps of:

determining a minimum average number of bits $R_{min}$ for encoding N">1 pictures; and prior to encoding the $l^{th}$ picture in the $n^{th}$ super frame with the associated third target number of bits, adjusting the associated third target number of bits, if necessary, to avoid falling below $$N'' R_{min} - \sum_{n'=n-N''}^{n-1} R_{l,n'}$$

wherein:

$$\sum_{n'=n-N''}^{n-1} R_{l,n'}$$

is a sum of the number of bits transmitted for the (n–N")$^{th}$ through (n–1)$^{th}$ pictures for the $l^{th}$ video program.

For a maximum rate, the method comprises the further steps of:

determining a maximum average number of bits $R_{max}$ for encoding N">1 pictures; and prior to encoding the $l^{th}$ picture in the $n^{th}$ super frame with the associated third target number of bits, adjusting the associated third target number of bits, if necessary, to avoid exceeding $$N'' R_{max} - \sum_{n'=n-N''}^{n-1} R_{l,n'}$$

wherein:

$$\sum_{n'=n-N''}^{n-1} R_{l,n'}$$

is a sum of the number of bits transmitted for the (n–N")$^{th}$ through (n–1)th pictures for the $l^{th}$ video program.

In a particular application of the invention, the video programs are adapted for communication over a broadband communication network to a decoder population.

The method may include the further step of transcoding pre-compressed video bit stream of a particular one of the plurality L of video programs into another bit stream, wherein the pre-compressed video bit stream is provided at a different bit rate after transcoding. This transcoding process allows the use of both uncompressed and pre-compressed video source data at a stat mux.

Another method of the present invention is presented for encoding uncompressed video source data, and transcoding pre-compressed video source data. The method includes the steps of: partially decompressing the pre-compressed video source data to obtain corresponding partially uncompressed video data; allocating bits for encoding the uncompressed video source data according to a statistical multiplexing scheme; and allocating bits for transcoding the partially uncompressed video data according to the statistical multiplexing scheme. The pre-compressed picture data is transcoded such that a bit rate of the pre-compressed picture data is different than a bit rate provided by the associated allocated bits.

Corresponding apparatus structures are also presented.

DETAILED DESCRIPTION OF THE INVENTION

The present invention relates to a method and apparatus for allocating bits in a statistical multiplexing system.

Figure 1:
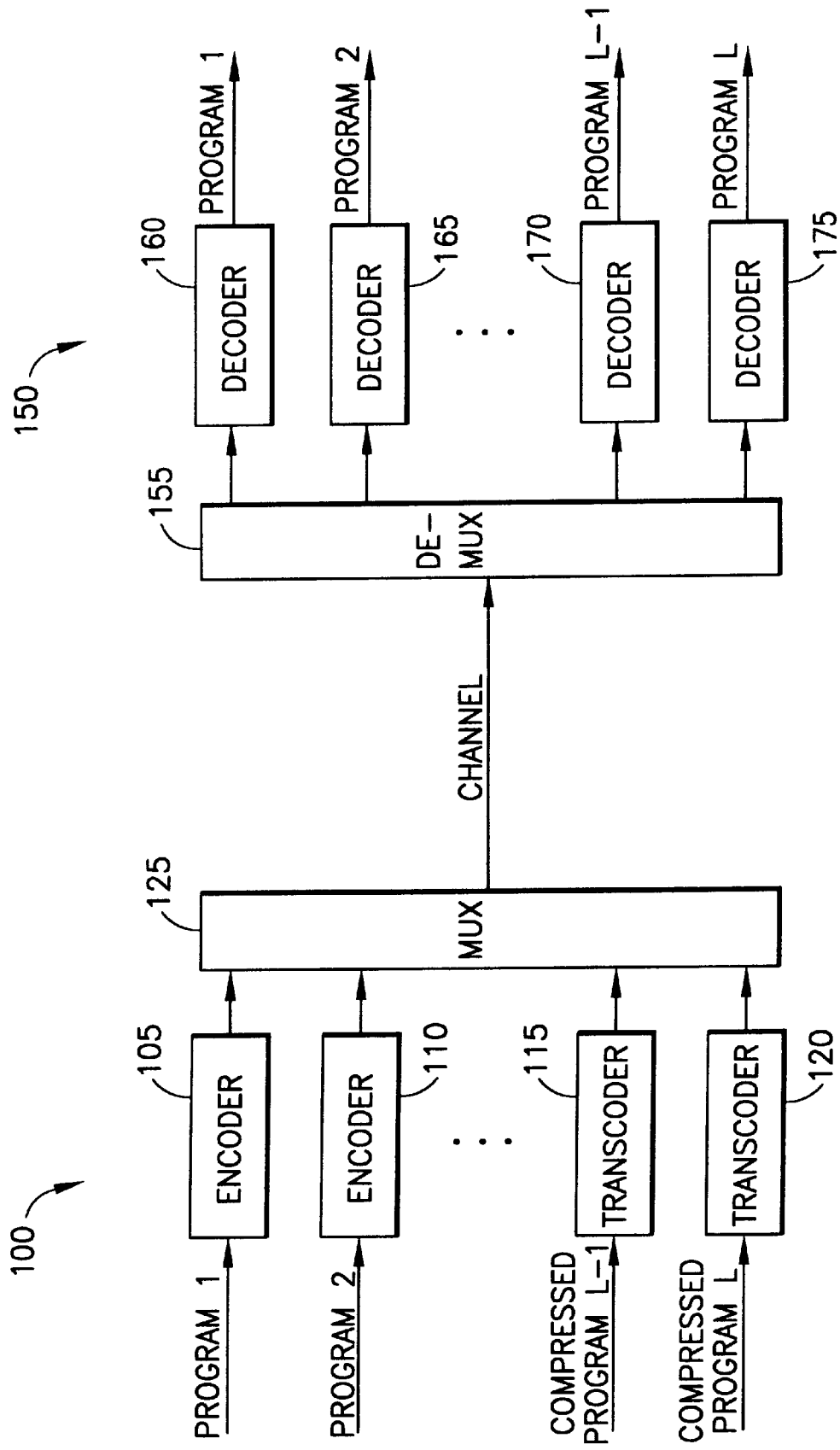
FIG. 1 illustrates an encoding and decoding system in accordance with the present invention.

FIG. 1 illustrates an encoding and decoding system in accordance with the present invention.

One problem with pre-compressed materials is that they could be pre-encoded at any bit rate, either a constant bit rate (CBR) or variable bit rate (VBR). Therefore, to accommodate the pre-compressed programs bit streams in a stat mux system, the corresponding rates have to be changeable. Transcoding is an operation of converting a bit stream into another bit stream at a different rate.

In FIG. 1, encoders 105 and 110 are provided, along with transcoders 115 and 120. At a transmitting site 100, such as a headend, encoders 105 and 110 receive uncompressed digital video data, e.g., in the pixel domain, from respective video programs or channels, program 1 and program 2. The transcoders 115 and 120 receive pre-compressed digital video data from respective compressed programs (e.g., bitstreams) L-1 and L. L is the total number of channels or programs at the encoder.

The encoded data is provided to a MUX 125 for transmission over a channel, such as a cable television network or satellite broadcast network, using conventional time-multiplexing and/or frequency-multiplexing techniques, for example.

At a decoding site 150, the multiplexed channels are demultiplexed at a DEMUX 155 and may be provided to decoders 160, 165, 170, 175. Typically, only one channel is actually decoded since a viewer usually views only one channel at a time. However, split-screen and picture-in-picture techniques allow a viewer to view two or more pictures at the same time, in which case each channel must be decoded. Moreover, the decoders shown may be independent or implemented using common hardware.

For illustration, decoders 160 and 165 provide the decoded data for programs 1 and 2, respectively, while decoders 170 and 175 provide the decoded data for programs L-1 and L, respectively.

Figure 2:
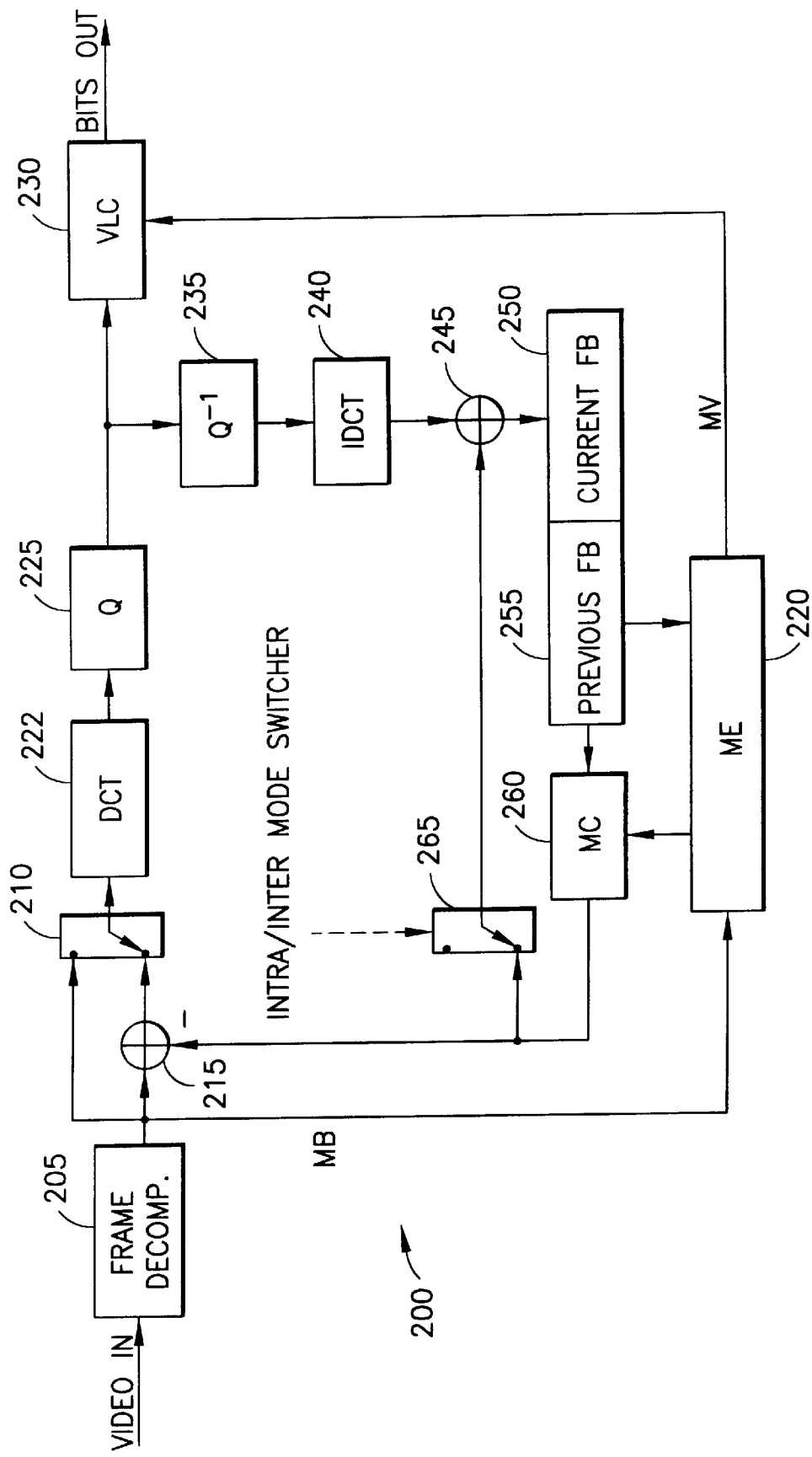
FIG. 2 illustrates an MPEG encoder for use with uncompressed video data in accordance with the present invention.
Figure 3:
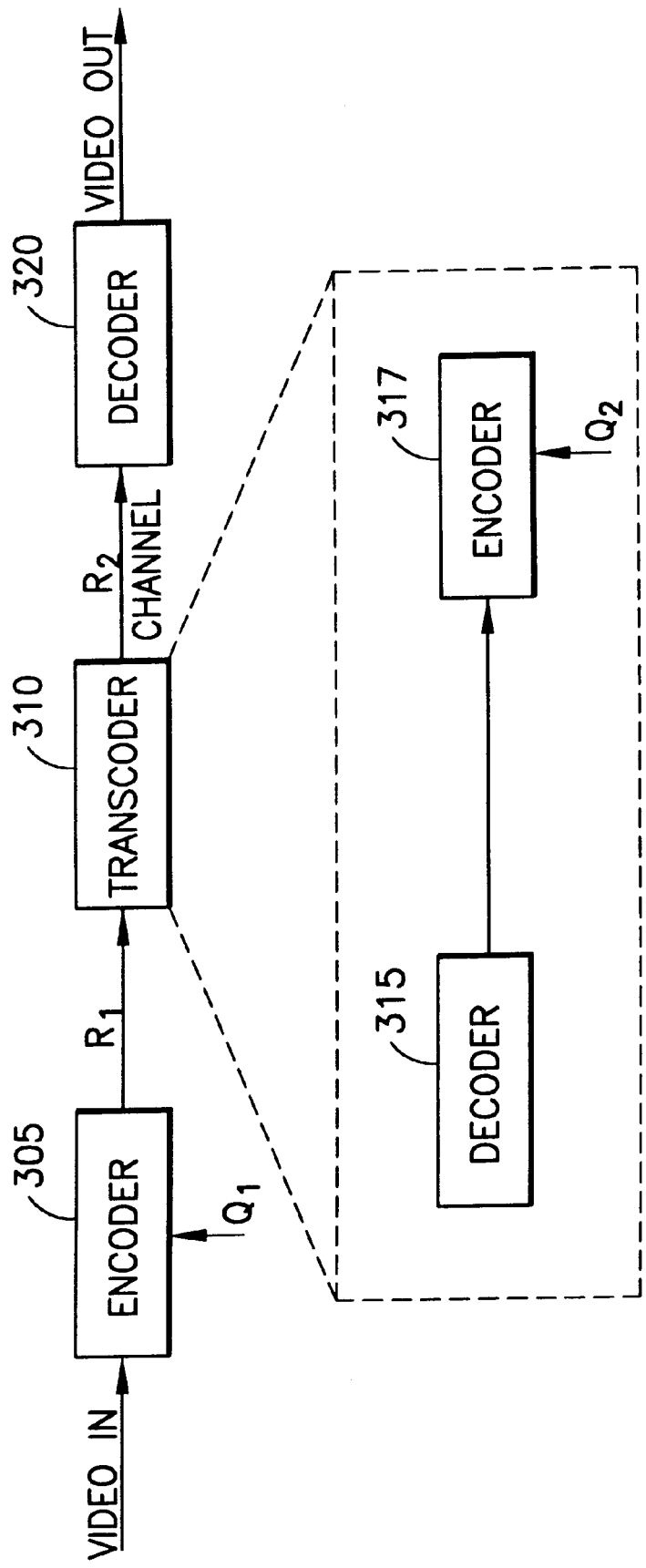
FIG. 3 illustrates a transcoder in accordance with the present invention.
Figure 4:
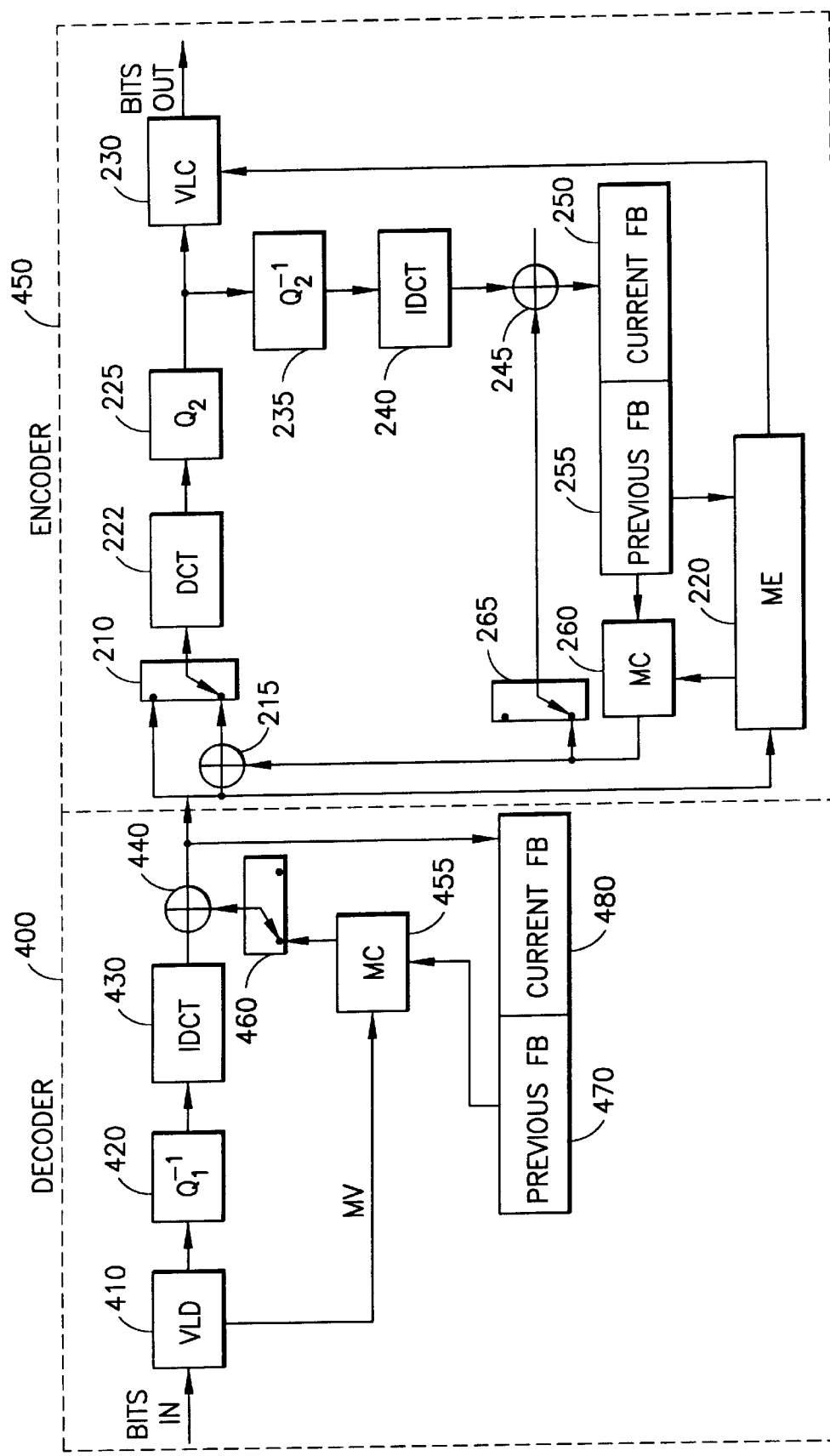
FIG. 4 illustrates a cascaded MPEG decoder/encoder for use with pre-compressed video data in accordance with the present invention.
Figure 5:
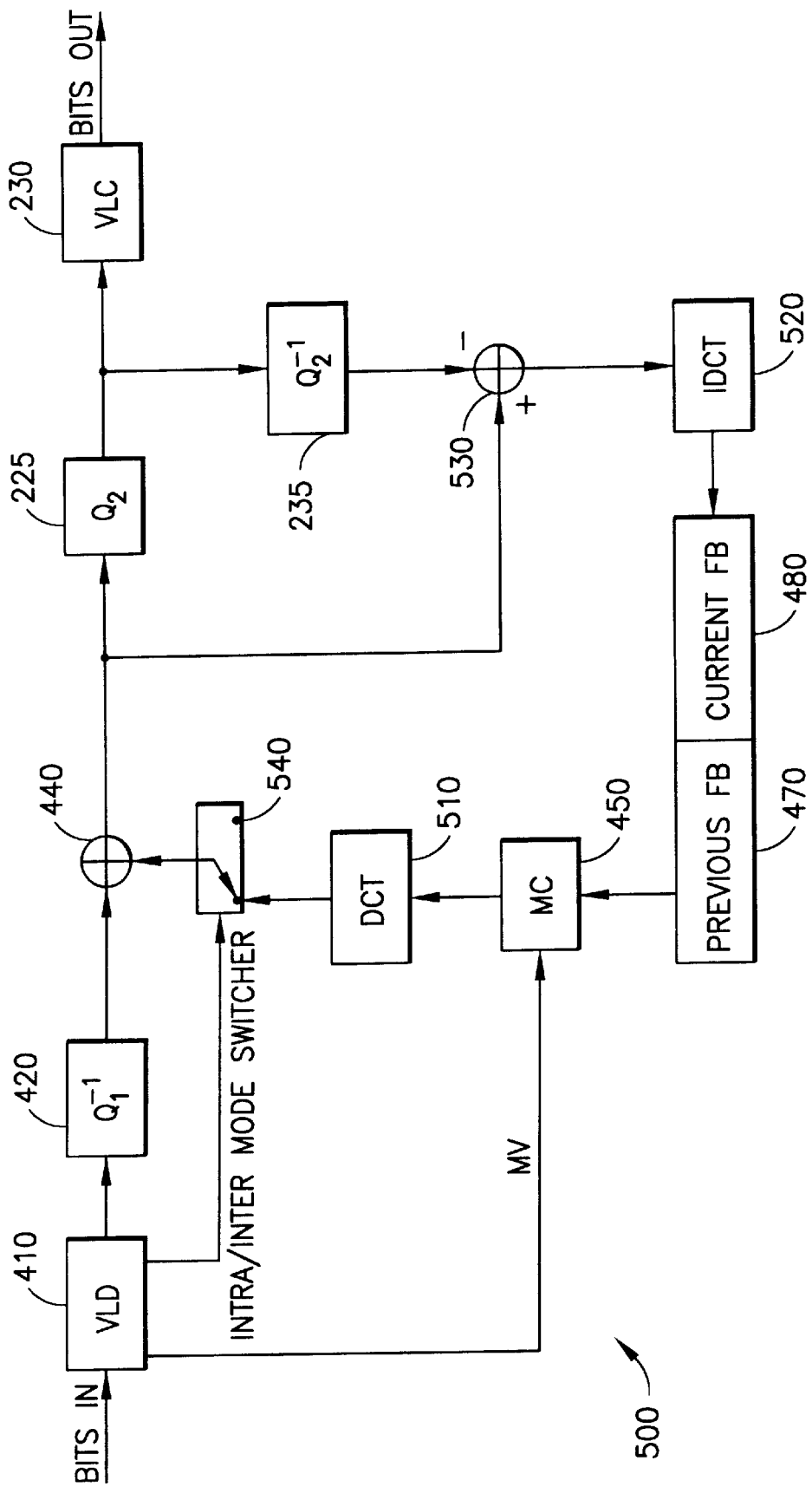
FIG. 5 illustrates a simplified transcoder in accordance with the present invention.

The encoders 105 and 110 may be provided as described in FIG. 2, while the transcoders 115 and 120 may be provided as described in FIGS. 3–5.

FIG. 2 illustrates an MPEG encoder for use with uncompressed video data in accordance with the present invention. In the encoder 200, a frame decomposition processor 205 decomposes an input video frame into segments such as slices and macroblocks. The pixel data is then provided to a intra/inter mode switch 210, an adder 215, and a Motion Estimation (ME) function 220. The switch 210 selects either the current pixel data, or the difference between the current pixel data and pixel data from a previous frame, for processing by a Discrete Cosine Transform (DCT) function 222, quantizer 225, and Variable Length Coding (VLC) function 230. The output of the VLC function 230 is a bitstream that is transmitted to a decoder. The bitstream includes Motion Vector (MV) data from the ME function 220.

In a feedback path, inverse quantization at a function 235 and an inverse DCT at a function 240 are performed to recover the pixel domain data. This data is summed with motion compensated data or a null signal at an adder 245, and the sum thereof is provided to a current Frame Buffer (FB) 250. Data from the current FB 250 and a previous FB 255 are provided to the ME function and a Motion Compensation (MC) function 260. A switch 265 directs either a null signal or the output of the MC function 260 to the adder 245 in response to the intra/inter mode switch control signal.

FIG. 3 illustrates a transcoder in accordance with the present invention. Uncompressed video is compressed at an encoder 305 at a quantization level (e.g., step size) $Q_1$ to produce data at a bit rate $R_1$. This data, which may be stored on a storage medium for subsequent retrieval, is provided to a transcoder 310, which comprises a cascaded decoder 315 and encoder 317. The data is decoded at the decoder 315 to recover the input video, or a close approximation thereof, due to the lossy nature of the encoding at encoder 305. The decoded or reconstructed data is then encoded at the encoder 317 at a different quantization level $Q_2$ to produce data at a bit rate $R_2$.

Commonly, $R_2 \leq R_1$. For example $R_1$=50 Mbps and $R_2$=3 Mbps.

The encoded data at rate $R_2$ is then communicated over a channel to a decoder 320 to provide the decoded output video, e.g., for display on a television.

FIG. 4 illustrates a cascaded MPEG decoder/encoder for use with pre-compressed video data in accordance with the present invention.

The cascaded MPEG decoder/encoder includes a decoder 400 and an encoder 450. Like-numbered elements of the encoder 450 correspond to the encoder of FIG. 2.

A compressed video bitstream is input to a Variable Length Decoder (VLD) 410, which is a counterpart of the VLC 330. An inverse quantizer function 420 processes the output of the VLD 410 using a first quantization step size, $Q_1$. An Inverse DCT (IDCT) function 430 processes the output of the inverse quantizer 420 to provide pixel domain data to an adder 440. This data is summed with either a motion compensation difference signal from MC 455 or a null signal, according to the position of a switch 460. The output of the adder 440 is provided to the encoder 450 and to a current FB 480 of the decoder 400. The MC function 455 uses data from the current FB 480 and a previous FB 470 along with MV data from the VLD 410.

The bit output rate of the transcoder 450 is adjusted by changing $Q_2$.

FIG. 5 illustrates a simplified transcoder in accordance with the present invention. Like-numbered elements of the transcoder 500 correspond to those in the transcoder of FIG. 4. The performance of the simplified transcoder is very close to that of the cascaded transcoder of FIG. 4. The transcoder saves hardware and processing steps by using only one current FB (Frame Buffer) 480 and previous FB 470, and one DCT function 510 and IDCT function 520

An adder 530 provides a transform domain difference signal to the IDCT 520. A switch 540 selects either the transform domain signal from the DCT function 510 or a null signal according to an intra/inter mode control signal.

Figure 6:
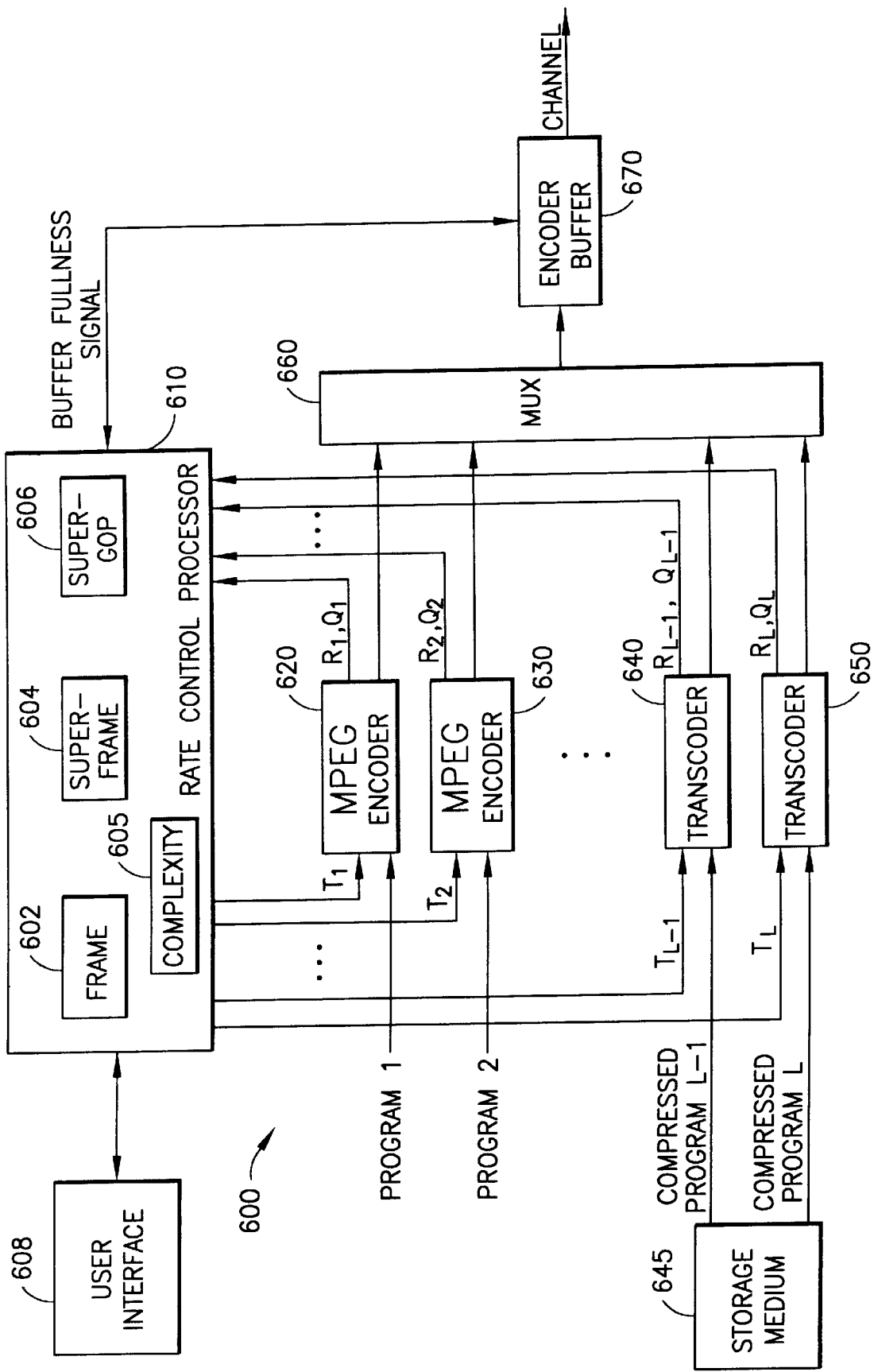
FIG. 6 illustrates a statistical multiplexing encoder in accordance with the present invention.

FIG. 6 illustrates a statistical multiplexing system in accordance with the present invention. The inputs to the encoder 600 can include uncompressed digital video sequences and/or pre-compressed bit streams. The uncompressed digital video sequences, e.g., programs 1 and 2, are encoded by MPEG encoders 620 and 630, respectively, for example. The pre-compressed programs (e.g., bitstreams) L-1 and L are processed by transcoders 640 and 650, respectively. The simplified transcoder configuration of FIG. 5 may be used. The encoded data is provided to a MUX 660 and encoder buffer 670 prior to being transmitted on a channel.

The pre-compressed program data may be retrieved from a storage medium 645, such as magnetic tape or compact disc, or may be received real-time, e.g., from a satellite transmission.

The encoder buffer 670 sends a fullness level signal to the rate control processor 610.

A user interface 608 may communicate with the rate control processor 610, for example to provide information regarding the GOP length and picture types in the different program streams.

The basic requirement in the stat mux encoder is to provide a relatively uniform picture quality within a program, and if necessary, also among programs. To achieve this goal, channel capacity is dynamically distributed among programs according to a program priority as well as a frame level program complexity measure.

Each MPEG encoder 620, 630 or transcoder, 640, 650 receives a target number of bits, $T_1$, $T_2$, $T_{L-1}$ and $T_L$, respectively, from a rate control processor 610 at each frame. The rate control processor 610 includes a super GOP level processing function 606, a super frame level processing function 604, a frame level processing function 602, and a complexity processor 605. These processing functions may share common hardware such as memory and processing chips, but are shown individually for simplicity.

The target number of bits for each frame of a program is met by adjusting the quantization parameter in the MPEG encoder or transcoder. The resulting number of compressed bits, R, as well as the average quantization parameter, Q, used for each frame are then sent to the rate control processor 610. Specifically, the encoder 620, encoder 630, transcoder 640 and transcoder 650 produce $R_1$, $R_2$, $R_{L-1}$ and $R_L$ bits, respectively, using quantization parameters $Q_1$, $Q_2$, $Q_{L-1}$ and $Q_L$, respectively. The complexity processor 605 calculates corresponding complexity values C using R and Q for each program. The rate control processor 610 then determines a new target number of bits for each new program frame or picture based on the program complexity at the frame level.

Below, the dynamic bit allocation procedure is detailed. Additional constraints on the target number of bits determined by the rate control processor 610 are also discussed to prevent buffer overflow and underflow at the encoder and decoder buffers.

Figure 7:
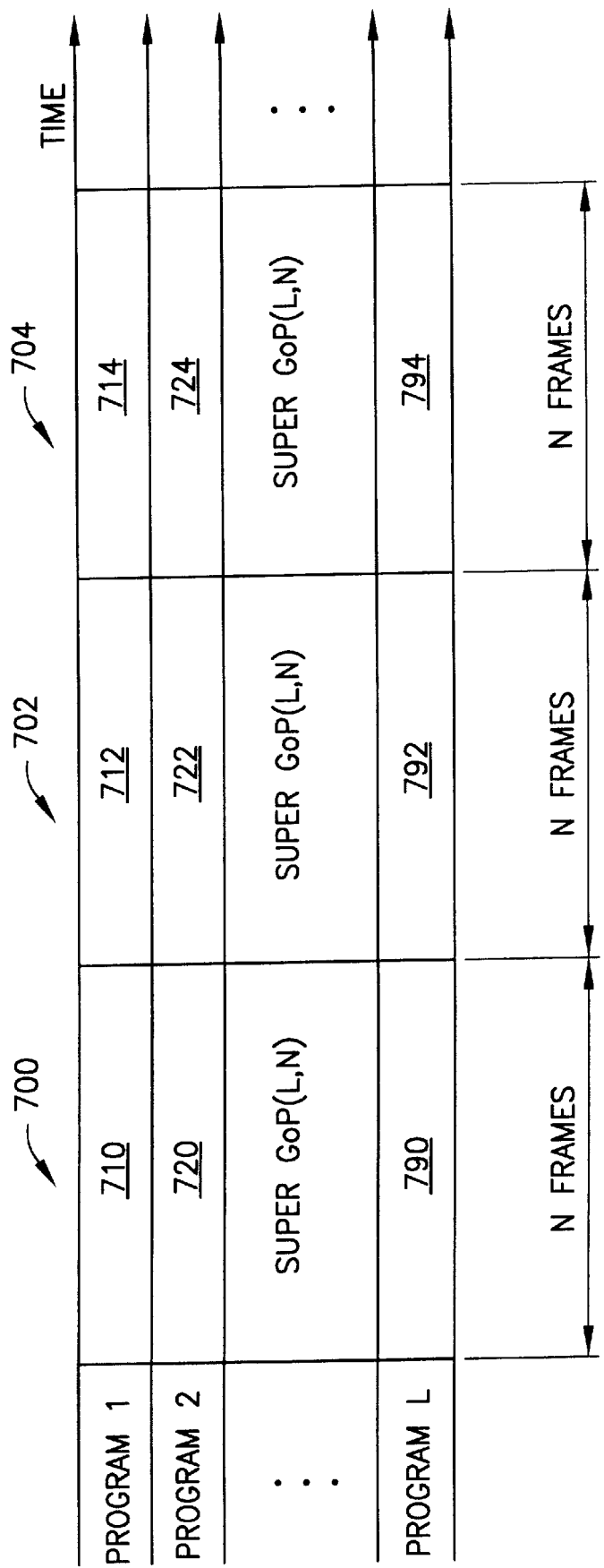
FIG. 7 illustrates a super GOP construct with aligned program GOPs in accordance with the present invention.

FIG. 7 illustrates a super GOP construct in accordance with the present invention. To summarize the problem, L video programs (e.g., channels or programming services) need to be delivered over a network with a fixed channel rate, $R_{channel}$. The L programs can be either pre-compressed program bit streams, or uncompressed digital video programs. Furthermore, the L programs can use any GOP structure, or program GOP length. Additionally, the distance between I or P pictures can be different for the different programs. The GOP length for each program is assumed to be available at the encoding site.

Super GOP and Target Bit Rate

The dynamic bit allocation system is hierarchical. At the top level, a "super GOP" is provided. The input programs are divided into super GOPs that have the same number of I, P and B pictures, and therefore each super GOP is assigned the same number of bits. A "super frame" is then provided at each frame instance as a collection of frames, namely one frame from each of the programs at the same time instant. Bit allocation for the super frames is based on a program complexity measure.

At a frame level, each regular frame (picture) receives a target number of bits proportional to its complexity measure. To ensure the encoder and decoder buffers never overflow or underflow, and to limit each individual bit rate within a specific range, constraints are applied to the target number of bits for the super frame as well as for each picture.

The L programs shown in FIG. 7, e.g., programs 1, 2, . . . , L, are conceptually divided into identical groups, designated super GOP(L,N), in terms of the number of frames of each picture type so that the same number of bits can be assigned to each super GOP. The GOPs of a program do not have to be aligned with the super GOPs, as discussed in connection with FIG. 8, below. That is, a super GOP boundary may cut through a program GOP.

But, in either case, each super GOP contains the same number of frames of each picture type from a program. For example, each super GOP may include two I-pictures, eight P-pictures and twenty B-pictures from a specific program. Determination of a super GOP can be made using a priori knowledge of the GOP length for each program. An operator may input the relevant data to the encoder using an interface such as a keyboard. Or, it is possible to pre-process the different program streams at an encoder using appropriate buffering capability to determine the GOP length.

Figure 8:
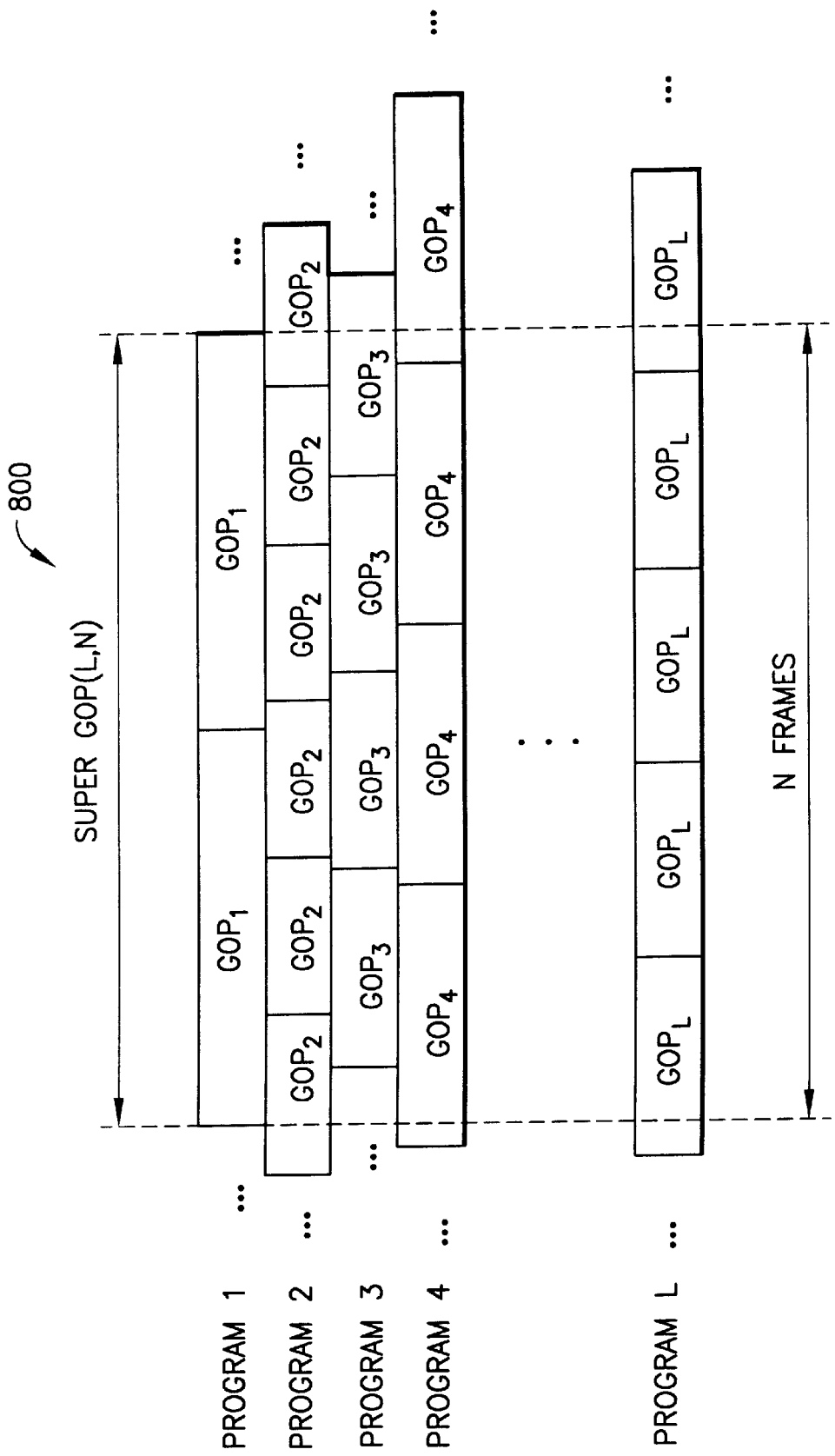
FIG. 8 illustrates a super GOP construct with non-aligned program GOPs in accordance with the present invention.

For example, in FIG. 7, a first super GOP 700 includes data frames from program 1 (710), program 2 (720), , . . . , and program L (790). Each program segment, e.g., 710, 720, and 790 contains a number of complete frames from one or more GOPs as discussed below. A second super GOP 702 includes data frames from program 1 (712), program 2 (722), and program L (792). A third super GOP 704 includes data frames from program 1 (714), program 2 (724), , . . . , and program L (794). In FIG. 7, the boundaries of the program GOPs do not have to coincide with the boundaries of the super GOPs. FIG. 8 illustrates a super GOP construct with non-aligned program GOPs in accordance with the present invention. Here, the GOPs in each program 1, 2, 3, 4, . . . , L are not all aligned with the left and right boundaries of the super GOP 800. For example, the GOPs for program 1 ($GOP_1$) are aligned with the boundaries of the super GOP 800. However, the GOPs for programs 2, 3, 4, . . . , L, e.g., $GOP_2$, $GOP_3$, $GOP_4$, . . . , and $GOP_L$, respectively, are not aligned with the boundaries of the super GOP 800. Each super GOP includes at least one GOP from each program, and may also include fractional portions of the GOPs of each program. Note, however, that the fractional portions of the first and last GOPs for a programs included in a super GOP can actually be considered as a complete GOP, as shown in FIG. 8. In other words, a super GOP always contains an integer number of GOPs of each program. The super GOP length is multiples of program GOP lengths. Furthermore, it is assumed that the distribution of picture types in GOPs for a programs is the same.

Here, L is the number of programs and N is the length of each super GOP. Each super GOP(L,N) contains L×N frames. Moreover, there can be many different N that can make super GOPs(L,N) identical in terms of the number of pictures of each type. However, from an implementation point of view, a small super GOP is preferable. Let $N_l$, l=1,2, . . . , L, be the GOP length for program 1. N is set equal to the least common multiple (L.C.M.) of $N_l$, l=1,2, . . . , L, i.e., $$N = L.C.M.(N_1, N_2, \ldots, N_l). \quad (1)$$

N, defined in equation (1), is the smallest number which can be divided by all $N_l$, l=1,2, . . . , L. Hence, the super GOPs (L,N) are the smallest identical groups containing the same number of frames of each picture type from each program. For example, considering only two different GOP lengths for N programs, say nine and fifteen, then the super GOP length N=45 (since 9×15=135, the smallest integer that divides 135 is 3, and 135/3=45).

Note that if all the programs 1, 2, 3, . . . ,L have the same GOP length, N, the super GOP length will be also equal to N, regardless of whether the program GOPs have the same patterns of I, P and B, or whether they are synchronized.

Since the super GOPs (L,N) with N defined by using equation (1) contain the same number of I, P and B pictures, the same number of bits, T, is assigned to each super GOP, i.e., $$T = (L \times N) \frac{R_{channel}}{\text{frame\_rate}} \quad (2)$$

where $R_{channel}$ is in bits/sec., and frame_rate is in frames/sec.

Analogous to the super frame concept of FIG. 9, below, the frame in each program GOP that is intersected by the super GOP boundary is selected as a super GOP boundary frame.

Super Frame and Target Rate

Figure 9:
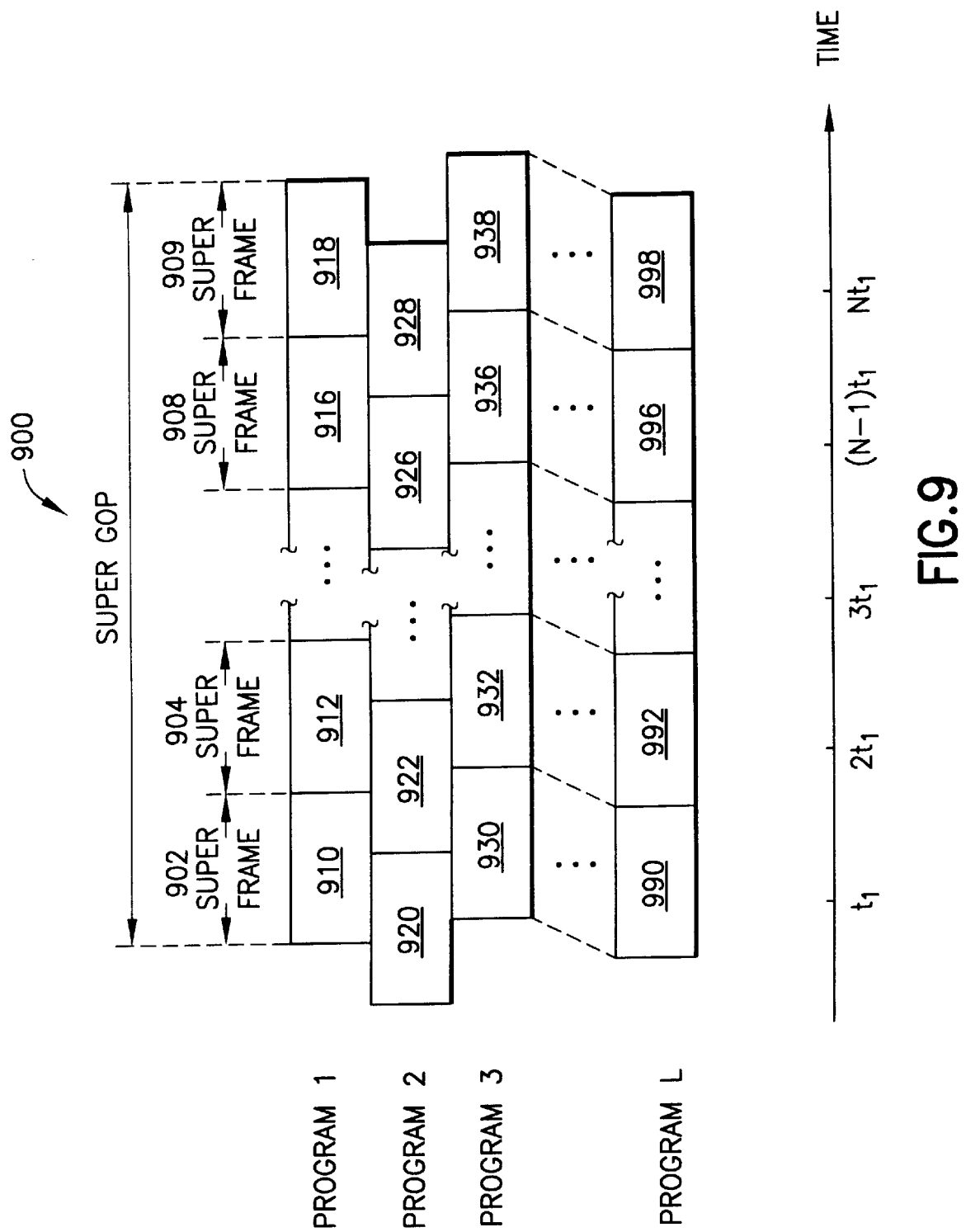
FIG. 9 illustrates a super frame construct in accordance with the present invention.

FIG. 9 illustrates a super frame construct in accordance with the present invention. Given the target number of bits, T, for a super GOP(L,N) 900, the next step is to determine the distribution of T over the frames of the super GOP. A "super frame" is defined as a collection of L frames, one from each of L programs taken at the same time instant, or common temporal reference point. For example, at time $t_1$, a super frame 902 includes frames 910, 920, 930, . . . , and 990. Similarly, at time $2t_1$, a super frame 904 includes frames 912, 922, 932, . . . , and 992. At time $(N-1)t_1$, a super frame 908 includes frames 916, 926, 936, . . . , and 996. At time $Nt_1$, a super frame 909 includes frames 918, 928, 938, . . . , and 998.

Each super GOP contains N super frames. For example, super GOP 900 includes super frames 902, 904, 906, 908 and 909. Note that since the L programs can have any program GOP structure, the L frames in a super frame can have any picture type, either I, P or B, for example.

Furthermore, program frame complexity can be used to determine a target number of bits for a super frame and an individual frame. A complexity measure, C, may be defined for a frame as the product of the quantization level, Q, used for the frame and the number of bits, R, generated for the frame by using the Q, i.e., (3) $C = RQ$.

However, it should be understood that any available complexity measure may be used. Let $Q_{l,n,t}$ and $R_{l,n,t}$ be, respectively, the quantization parameter used for frame n of program l and the corresponding number of bits generated for the frame using $Q_{l,n,t}$, where n ranges from one to the number of super frames in a super GOP (e.g., five in the simplified example of FIG. 9), l ranges from one to L, and t corresponds to the picture type, I, P or B. For example, $Q_{2,3,B}$ corresponds to program 2, third frame, e.g., frame 924, assuming it is a B-picture.

For a super frame n, there can there be L different frame complexity measures, one for each regular frame, i.e., (4) $C_{l,n,t} = Q_{l,n,t} R_{l,n,t}$   $l=1,2,\ldots,L$ Furthermore, let $T_n$ be the target number of bits for super frame n. The total number of bits generated from the L regular frames within the super frame n should be close to $T_n$, i.e., $$T_n = \sum_{l=1}^{L} R_{l,n,t} = \sum_{l=1}^{L} \frac{C_{l,n,t}}{Q_{l,n,t}}. \quad (5)$$

Similarly, the total number of bits generated for all N super frames in a super GOP should be close to the target number of bits, T, assigned for each super GOP, i.e., $$T = \sum_{n=1}^{N} T_n. \quad (6)$$

For the stat mux system to achieve a more uniform picture quality, ideally, the same quantization parameter should be applied to all the frames. Note that quantization is the only lossy operation in MPEG encoding and plays a critical role in controlling both the picture quality and the bit rate. However, in order to account for the different picture types (I, P and B), a constant weighting factor, $K_{l,n,t}$, is provided for each picture type t, i.e., $$Q_{l,n,t} = K_{l,n,t} Q, \quad \text{where} \quad (7)$$

$$K_{l,n,t} = \begin{cases} K_I & \text{for } I \text{ picture} \\ K_P & \text{for } P \text{ picture} \\ K_B & \text{for } B \text{ picture} \end{cases} \quad (8)$$

The subscript "t" is an index for the picture type, e.g., I, P or B. This subscript may be omitted in some of the equations herein when its presence is not necessary. It is possible to use the following weighting factors: $K_I = K_P = 1$ and $K_B = 1.4$.

Furthermore, in many cases, it is desirable for some of the programs to be given a higher priority (e.g., relative number of bits) than others. Thus, the quality level among programs can be controlled. Again, since quantization is the primary lossy operation, the program quality level can be controlled by controlling quantization. Specifically, the quantization parameter for program, l, can be further modulated by a weighting factor, $w_l$, as (7a) $Q_{l,n,t} = w_l K_{l,n,t} Q$ For programs with higher priority, a smaller weighting factor is used, and for lower priority programs, a larger weighting factor is used. A larger quantization level results in coarser step sizes (e.g., a lower quality image), while a smaller quantization level results in finer step sizes (e.g., a higher quality image). Thus, by controlling the weighting factor, $w_l$, in eqn. (7a), the quantization parameter and, therefore, the quality, is controlled. From equations (5)–(7), the target number of bits for super frame n, $T_n$, is $$T_n = \frac{\sum_{l=1}^{L} \frac{1}{w_l K_{l,n,t}} C_{l,n,t}}{\sum_{n=1}^{N} \sum_{l=1}^{L} \frac{1}{w_l K_{l,n,t}} C_{l,n,t}} T, \quad (9)$$

where the numerator is the sum of the complexity measures for the L regular frames in super frame n, and the denominator is the sum of the complexity measures for all the frames in the current super GOP. In other words, the target number of bits for super frame n, $T_n$, is proportional to its complexity.

With the above bit allocation equation, computation of the target number of bits for a super frame requires the complexity measures for all the L×N frames within the current super GOP(L,N), i.e., $C_{l,n,t}$, l=1,2, . . . ,L and n=1,2, . . . ,N. However, this may not be practical or desirable in some cases due to required memory capacity and potential processing delays.

Accordingly, an alternative, simplified bit allocation scheme is provided. First, at each super frame n', only consider the distribution of the remaining bits, $T_r$, defined as $$T_r = T_r - \sum_{l=1}^{L} R_{l,n'-1,t} \quad (10)$$

over the remaining super frames from n' to N in the super GOP(L,N). This leads to the bit allocation for super frame n' as $$T_{n'} = \frac{\sum_{l=1}^{L} \frac{1}{w_l K_{l,n',t}} C_{l,n',t}}{\sum_{n=n'}^{N} \sum_{l=1}^{L} \frac{1}{w_l K_{l,n,t}} C_{l,n,t}} T_r \quad (11)$$

The complexity measures for the previous frames from 1 to $n'-1$ are now no longer necessary in computing the target number of bits for super frame $n'$, $T_{n'}$. At the start of processing a new super GOP, $T_r$ is re-set as follows:

(12) $T_r = T_r + T$, where T is the target number of bits for a new super GOP, and $T_r$ on the right of the equation, which can be either a positive or negative number, is the number of bits left from the previous super GOP.

Secondly, in accordance with the present invention, assume that all the future frames of the same picture type in a program (in a super GOP) have the same complexity measure, i.e.,

(13) $C_{l,n,t} = C_{l,n',t}$      $n' \leq n \leq N$, which is a reasonable assumption for continuous scenes. For example, the complexity measure of a P-picture in the lth video program of a super GOP may be used as the complexity measure for the following P-picture in the lth video program in the same super GOP. Advantageously, there is no need to calculate a separate complexity measure for each picture. Moreover, the present inventors have determined that satisfactory results are achieved when assuming all future frames of the same picture type in a program have the same complexity measure.

Now, for each program, only three frame complexity measures are required, each corresponding to one of the three picture types, I, P or B, i.e., $C_{l,I}$, $C_{l,P}$, and $C_{l,B}$, respectively. The three complexity measures for a program are updated after encoding each frame n' (see eqn. (4)), at least for every picture in a program prior to the last picture in a super GOP. The complexity measures can be estimated or calculated based upon the average quantization parameter used for the previous frame of the same type (e.g., averaged over a picture), and the number of bits generated for the frame (see eqn. (3)). In other words, the complexity measures are available at the current frame for each program. The bit allocation strategy for super frame n therefore becomes (14)

$$T_n = \frac{\sum_{l=1}^{L} \frac{1}{w_l K_{l,n,t}} C_{l,n,t}}{\sum_{l=1}^{L} \left[ N_{l,I} \frac{C_{l,I}}{w_l K_I} + N_{l,P} \frac{C_{l,P}}{w_l K_P} + N_{l,B} \frac{C_{l,B}}{w_l K_B} \right]} T_r$$

Here,

1. $C_{l,n,t}$ is the complexity measure corresponding to the picture type $t \in \{I,P,B\}$ of frame n for program l.

2. $K_{l,n,t}$ is a constant factor used to compensate for the picture type t of frame n of program l. It can be either $K_I$, $K_P$ or $K_B$, depending upon the picture type.

3. $N_{l,I}$, $N_{l,P}$ and $N_{l,B}$ are, respectively, the remaining number of I, P and B pictures for program l in the super GOP at super frame n.

4. $w_l$ is the quality weighting factor for program l, and is determined by the program or network service provider.

Note that the numerator on the right side of equation (14) is the sum of complexity measures for all the frames in super frame n. It can be considered a complexity measure for super frame n. On the other hand, the denominator can be considered as a complexity measure for the entire set of the remaining frames in the super GOP. Hence, equation (14) assigns a super frame a target number of bits proportional to the super frame's complexity measure.

Constraint on Super Frame Target Rate

Referring to the encoder buffer 670 of FIG. 6, the encoder buffer fullness at frame n, $B_n^e$, can be calculated as $$B_n^e = B_{n-1}^e + \sum_{l=1}^{L} R_{l,n,t} - R_{channel(bpf)}, \quad (15)$$

where $$R_{channel(bpf)} = \frac{\text{channel\_rate}}{\text{frame\_rate}}$$

is the average number of bits per frame (bpf) transmitted over the channel. Let $B_{max}^e$ be the maximum encoder buffer size. Then, to ensure that the encoder buffer never overflows or underflows, the buffer fullness, $B_n^e$, must be constrained within the range $[0, B_{max}^e]$, i.e.,

(16) $0 \leq B_n^e \leq B_{max}^e$.

From equations (15) and (16), we have $$0 \leq B_{n-1}^e + \sum_{l=1}^{L} R_{l,n,t} - R_{channel(bpf)} \leq B_{max}^e, \text{ or} \quad (17)$$

$$R_{channel(bpf)} - B_{n-1}^e \leq \sum_{l=1}^{L} R_{l,n,t} \leq R_{channel(bpf)} + B_{max}^e - B_{n-1}^e. \quad (18)$$

In accordance with the present invention, this is a constraint on the total number of bits generated for super frame n for a given $R_{channel(bpf)}$. If the aggregate number of bits can be controlled to meet the target number of bits, i.e., $$T_n = \sum_{l=1}^{L} R_{l,n,t}, \quad (19)$$

the constraint on the total number of bits for a super frame n becomes the constraint on the target number of bits for super frame, i.e.,

(20) $R_{channel(bpf)} - B_{n-1}^e \leq T_n \leq R_{channel(bpf)} + B_{max}^e - B_{n-1}^e$ Hence, before starting to encode each super frame n, the target rate determined by equation (14) is checked to determine whether it is in the proper range, and if not, the target rate is adjusted as follows:

$$T_n = \begin{cases} R_{channel(bpf)} - B^e_{n-1}, & \text{if} \quad T_n < R_{channel(bpf)} - B^e_{n-1} \\ R_{channel(bpf)} + B^e_{max} - B^e_{n-1} & \text{if} \quad T_n > R_{channel(bpf)} + B^e_{max} - B^e_{n-1} \\ T_n & \text{otherwise.} \end{cases} \quad (21)$$

Target Rate for Regular Frames

Once a target number of bits for a super frame has been set, what remains is to distribute the bits over the regular frames in the super frame. In accordance with the present invention, the target number of bits for frame n of program l, $T_{l,n}$, is $$T_{l,n} = \frac{\frac{1}{w_l K_{l,n,t}} C_{l,n,t}}{\sum_{l=1}^{L} \frac{1}{w_l K_{l,n,t}} C_{l,n,t}} T_n, \quad (22)$$

where the numerator on the right is the complexity measure for frame n of program l, and the denominator is the complexity measure for super frame n. The distribution of $T_n$ assigned for super frame n over L regular frames in the super frame is again based upon the complexities of the program frames.

Constraint on Target Rate for Regular Frame

In multi-program broadcast applications, several video programs are multiplexed on a single fixed rate transmission channel. Service information included in the bit stream, such as packet identifiers (PIDs) provides the necessary navigation information to allow a headend server to select the desired programs for transmission, and to allow a set-top decoder at a user's home to turn to the proper channel and extract (demultiplex) the packets corresponding to the selected programs, as shown in FIG. 10.

Figure 10:
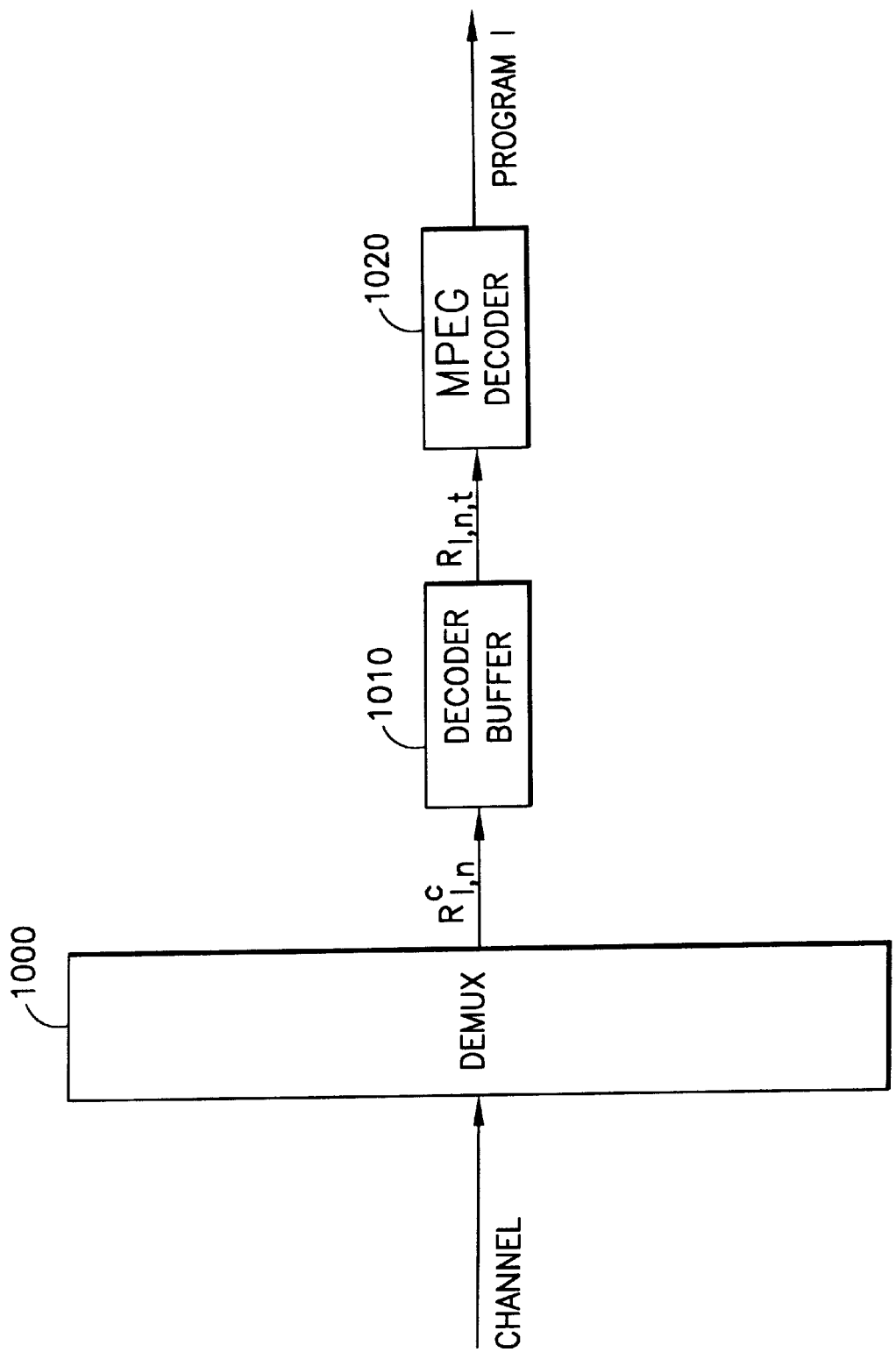
FIG. 10 illustrates a decoder in accordance with the present invention.

FIG. 10 illustrates a decoder in accordance with the present invention. Multiplexed data from the transmission channel, such as a cable television network and/or a satellite distribution network, is received by a DEMUX 1000. Based on a default or user selection, a particular program in the multiplex is selected for decoding and display.

Data from successive frames of the selected program is provided from the DEMUX 1000 to the decoder buffer 1010, and then to an MPEG decoder 1020, for example, to recover the program data in the pixel domain, e.g., for a program l. The decoder 1020 may correspond to the decoder 400 of FIG. 4.

The demultiplexed bit stream is at a variable rate. To ensure that the decoder buffer 1010 does not overflow or underflow when any of the programs are selected, additional restrictions must be imposed at the encoder.

Specifically, assume that program 1 is selected and that the decoding delay is N' frames. The decoding delay is the time a frame spends in the decoder's buffer before being decoded. Let $R_{l,n}^c$ be the number of bits transmitted for program l during the nth frame period, where the superscript "c" designates "channel". Then, the decoder buffer will be filled up to a level $$B_0^d = \sum_{n=1}^{N'} R_{l,n}^c \quad (23)$$

before any bits are moved out for decoding. The superscript "d" designates "decoder". During the period of frame n>N', the decoder buffer moves $R_{l,n,t}$ bits to the decoder, and receives $R_{l,n+N'}^c$ bits from the channel. The buffer fullness at frame n>N' is therefore given as $$B_n^d = B_{n-1}^d + R_{l,n+N'}^c - R_{l,n,t} = \sum_{n'=n}^{n+N'} R_{l,n'}^c - B_{l,n-1}^e - R_{l,n,t}, \quad (24)$$

where $$B_{l,n}^e = \sum_{n'=1}^{n} R_{l,n',t} - \sum_{n'=1}^{n} R_{l,n'}^c \quad (25)$$

can be considered as the fullness of a virtual encoder buffer for program l at frame n. The superscript "e" designates "encoder". Note that $R_{l,n'}^c$ is the number of bits transmitted during the interval of frame n' of program l, not the number of bits used to encode the frame.

Let $B_{max}^d$ the maximum decoder buffer size. To ensure the decoder buffer never overflows or underflow, the buffer fullness, $B_n^d$, has to be within the range of $[0, B_{max}^d]$, i.e., $$(26) \quad 0 \leq B_n^d \leq B_{max}^d.$$

From equations (24) and (26), we have $$0 \leq \sum_{n'=n}^{n+N'} R_{l,n'}^c - B_{l,n-1}^e - R_{l,n,t} \leq B_{max}^d, \text{ or} \quad (27)$$

$$\sum_{n'=n}^{n+N'} R_{l,n'}^c - B_{l,n-1}^e - B_{max}^d \leq R_{l,n,t} \leq \sum_{n'=n}^{n+N'} R_{l,n'}^c - B_{l,n-1}^e. \quad (28)$$

In accordance with the present invention, this is a constraint on the number of bits generated for frame n of program l. Again, we assume that the bit rate for each program can be controlled to meet its target rate, i.e., $$(29) \quad T_{l,n} = R_{l,n,t}.$$

The constraint on the number of bits for each individual frame (l,n) becomes the constraint on the target number of bits for the frame, i.e., $$\sum_{n'=n}^{n+N'} R_{l,n'}^c - B_{l,n-1}^e - B_{max}^d \leq T_{l,n} \leq \sum_{n'=n}^{n+N'} R_{l,n'}^c - B_{l,n-1}^e. \quad (30)$$

Hence, before starting to encode each frame n of program l, we need to check if its target rate is within the proper range, and if not, the target rate is adjusted as follows:

$$T_{l,n} = \begin{cases} \sum_{n'=n}^{n+N'} R_{l,n'}^c - B_{l,n-1}^e - B_{max}^d & \text{if} \quad T_{l,n} < \sum_{n'=n}^{n+N'} R_{l,n'}^c - B_{l,n-1}^e - B_{max}^d \\ \sum_{n'=n}^{n+N'} R_{l,n'}^c - B_{l,n-1}^e & \text{if} \quad T_{l,n} > \sum_{n'=n}^{n+N'} R_{l,n'}^c - B_{l,n-1}^e \\ T_{l,n} & \text{otherwise} \end{cases} \quad (31)$$

Note that $B_{l,n-1}^e$ is the fullness of a virtual encoder buffer for program l at frame n−1 and hence, it is available at frame n. However, $R_{l,n'}^c, n'=n, n+1, \ldots, n+N'$, are the numbers of bits that will be transmitted for program l during the intervals of the current and future frames $n, n+1, \ldots, n+N'$. With a constant bit/frame channel rate, $R_{l,n'}^c, n'=n, n+1, \ldots, n+N'$ can be measured in the encoder buffer, as shown in FIG. 11.

Figure 11:
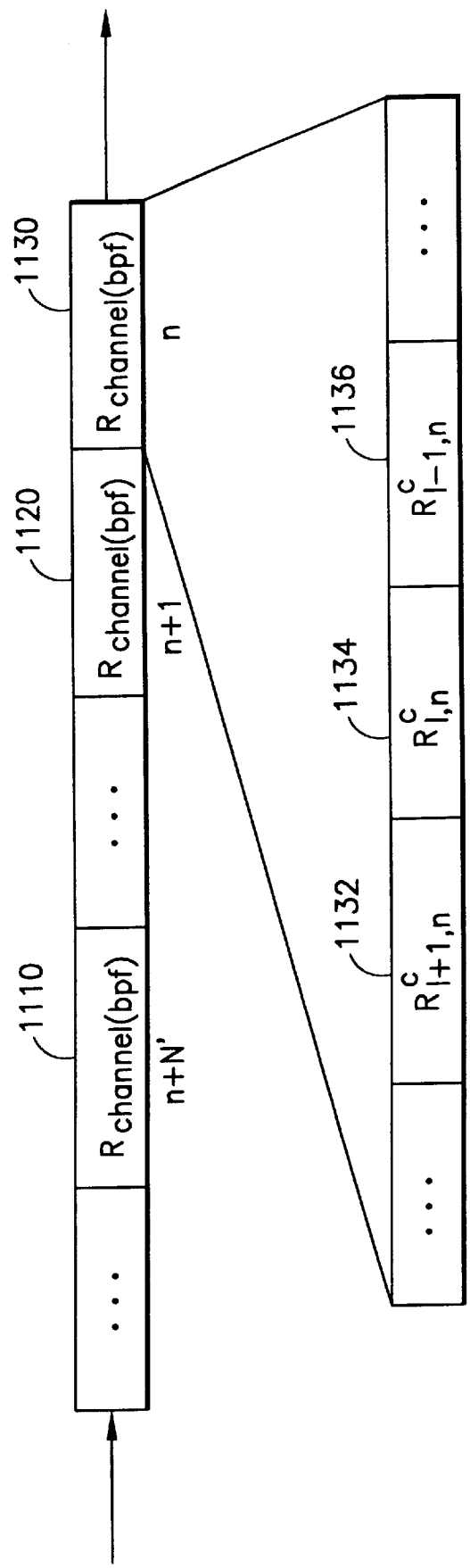
FIG. 11 illustrates data stored in an encoder buffer in accordance with the present invention.

FIG. 11 illustrates data stored in an encoder buffer in accordance with the present invention. An encoder buffer may be provided after the VLC 330 in FIGS. 3–5, for example. Within each slot window $n=n, n+1, \ldots, n+N'$ of $R_{channel(bpf)}$ bits in the encoder buffer, the number of bits for program l is $R_{l,n}^c$. Note that $R_{l,n}^c$ can be zero.

For example, slot windows n+N' (1110), n+1 (1120), and n (1130) are shown. Slot window n (1130) includes slots $R_{l+1,n}^c$ (1132), $R_{l,n}^c$ (1134), and $R_{l-1,n}^c$ (1136).

When a frame n is encoded, all the compressed bits are moved into the encoder's buffer. This can be accomplished on a program-by-program basis by compressing the entire frame of a program at frame n, moving all of the bits into the encoder's buffer, and processing the next program at the same frame index n, and so forth. Or, processing can occur by processing a portion of a frame, such as a macroblock or slice, at a time. What is important in modeling the encoder's buffer is the number of bits generated for a program in a frame interval.

Constraint on Max and Min Bit Rate

The average bit rate over a certain number of frames, N", can be controlled by limiting the target number of bits for each frame within a specific range. This may be desirable, for example, to prevent large fluctuations in the bandwidth consumed by each program. Let $R_{max}$ and $R_{min}$ be the allowed maximum and minimum average number of bits, respectively, over every N" frames. The average number of bits per N" frames up to a frame n therefore has to be in the range of $[R_{min}, R_{max}]$, i.e., $$R_{min} \leq \frac{1}{N''} \sum_{n'=n-N''}^{n} R_{l,n,t} \leq R_{max}, \text{ or} \quad (32)$$

$$N'' R_{min} - \sum_{n'=n-N''}^{n-1} R_{l,n,t} \leq R_{l,n,t} \leq N' R_{max} - \sum_{n'=n-N''}^{n-1} R_{l,n,t}. \quad (33)$$

This is another constraint on the number of bits for frame n of program l. Note that $R_{l,n',t}, n'=n-N'', n-N'', \ldots, n-1$, are all available to the encoder at frame n. Again, assume that the actual rate can be made close to the target rate by proper control of the target number of bits, i.e., $$(34) \quad T_{l,n} = R_{l,n,t}.$$

The additional constraint on the actual number 5 of bits for frame n then becomes a constraint on its target number of bits, i.e., $$N'' R_{min} - \sum_{n'=n-N''}^{n-1} R_{l,n,t} \leq T_{l,n} \leq N'' R_{max} - \sum_{n'=n-N''}^{n-1} R_{l,n,t}. \quad (35)$$

In summary, in accordance with the present invention, the target number of bits for each individual frame is adjusted as follows:

$$T_{l,n} = \begin{cases} N'' R_{min} - \sum_{n'=n-N''}^{n-1} R_{l,n',t} & \text{if} \quad T_{l,n} < N'' R_{min} - \sum_{n'=n-N''}^{n-1} R_{l,n',t} \\ N'' R_{max} - \sum_{n'=n-N''}^{n-1} R_{l,n',t} & \text{if} \quad T_{l,n} > N'' R_{max} - \sum_{n'=n-N''}^{n-1} R_{l,n',t} \\ T_{l,n} & \text{otherwise.} \end{cases} \quad (36)$$

Rate Control

Now, the target number of bits for each frame of a program must be met. This can be achieved by adjusting the quantization parameter, Q, in the MPEG encoder (FIG. 3) and $Q_2$ in the transcoder (FIGS. 4 and 5). The rate control scheme described in ISO/IEC (MPEG-2) "Test Model 5" (TM5), April 1993 may be used, for example. An alternative rate control scheme that is more accurate than TM5 can be found in L. Wang, "Rate Control for MPEG Video Coding", *Proc. SPIE on Visual Communications and Image Processing*, pp.53–64, Taiwan, May 1995, which requires multiple operations of VLC and Q for each frame.

Accordingly, it can be seen that the present invention provides a method and apparatus for allocating bits-in a stat mux system. The invention extends the concept of the stat mux to accommodate both compressed and uncompressed video programs using transcoding and encoding, respectively. Additionally, for super GOP and super frame bit allocation schemes, the invention provides target bit rates, and constraints on the target bit rates, for super GOPS, super frames, and regular frames, as well as constraints on overall minimum and maximum bit rates. Further efficiencies are realized by assuming all pictures of the same type in a program of a super GOP have the same complexity, thereby avoiding the need to calculate and maintain the complexity for each picture in determining the (first, second and third) target number of bits.

A target number of bits, $T_n$, for a super frame, which is a collection of frames across all channels at a given frame instance, is adaptive and is able to address any combination of picture types. Frames of the same picture type for a program are assigned the same (or similar) number of bits. To achieve this adaptation in bit allocation, the invention provides a dynamic bit allocation strategy which determines a target number of bits for each program on a frame-by-frame basis according to the previous coding information, such as quantization parameters used, and the resulting number of bits.

Hierarchical dynamic bit allocation is used, starting from a super GOP level, then to a super frame level, and then to the individual frame (picture) level. The concept can be further extended to a sub-frame level, where bits are allocated for a portion of a frame such as a slice or Video Object Plane (VOP). At each level, a target number of bits is determined.

Furthermore, to prevent the encoder and decoder buffers from overflowing or underflowing, constraints are imposed on the compressed bit rate of each program in the multi-program transmission environment.

Additionally, program quality can be controlled according to a program priority weighting factor.

Although the invention has been described in connection with various specific embodiments, those skilled in the art will appreciate that numerous adaptations and modifications may be made thereto without departing from the spirit and scope of the invention as set forth in the claims.

For example, while the invention was discussed in terms of the MPEG-2 standard, it may be adapted for use with other standards which use groups of pictures or analogous constructs with different picture types.

What is claimed is:

1. A bit allocation method for digital video, comprising the steps of:
providing a plurality L of video programs at an encoder, each program having successive groups of pictures (GOPs);
each GOP having an associated number of pictures;
providing a super GOP comprising at least one GOP from each of said L video programs, and having a length of N pictures;
calculating a first target number of bits, T, for encoding said super GOP according to the number of pictures in said super GOP, L×N, and an available capacity of a channel over which the video programs are transmitted;
wherein each super GOP comprises a plurality N of super frames, each super frame having L pictures at a common temporal reference point;
defining a respective complexity measure for each picture type in each $l^{th}$ program;
calculating a second target number of bits for encoding each $n^{th}$ super frame of pictures, where n=1, . . . , N, according to said first target number of bits, T, and the complexity measure of each $l^{th}$ picture in the associated $n^{th}$ super frame, where l=1, . . . , L;
calculating a third target number of bits for encoding each $l^{th}$ picture in the associated $n^{th}$ super frame according to said second target number of bits and the associated complexity measure, and a sum of the complexity measures for each picture in the associated $n^{th}$ super frame; and providing respective weighting factors, w, for the different video programs according to a relative priority thereof; wherein:
said third target number of bits for encoding each $l^{th}$ picture in the associated $n^{th}$ super frame is calculated according to the respective weighting factor of the associated $l^{th}$ video program.

2. A bit allocation method for digital video, comprising the steps of:
providing a plurality L of video programs at an encoder, each program having successive groups of pictures (GOPs);
at least one of said video programs comprising uncompressed video data;
each GOP having an associated number of pictures;
processing pre-compressed picture data to obtain partially uncompressed data of at least a particular one of said plurality L of video programs;
providing a super GOP comprising at least one GOP from each of said L video programs, and having a length of N pictures;
calculating a first target number of bits, T, for encoding said super GOP according to the number of pictures in said super GOP, L×N, and an available capacity of a channel over which the video programs are transmitted;
wherein each super GOP comprises a plurality N of super frames, each super frame having L pictures at a common temporal reference point;
defining a respective complexity measure for each picture type in each $l^{th}$ program;
calculating a second target number of bits for encoding each $n^{th}$ super frame of pictures, where n=1, . . . , N, according to said first target number of bits, T, and the complexity measure of each $l^{th}$ picture in the associated $n^{th}$ super frame, where l=1, . . . , L; and
calculating a third target number of bits for encoding each $l^{th}$ picture in the associated $n^{th}$ super frame according to said second target number of bits and the associated complexity measure, and a sum of the complexity measures for each picture in the associated $n^{th}$ super frame; wherein:
said pre-compressed picture data is transcoded such that a bit rate of said pre-compressed picture data is different than a bit rate provided by the associated third target number of bits.

3. A bit allocation method for digital video, comprising the steps of:
providing a plurality L of video programs at an encoder, each program having successive groups of pictures (GOPs);
wherein a buffer associated with said encoder receives encoded data from the video programs,
each GOP having an associated number of pictures;
providing a super GOP comprising at least one GOP from each of said L video programs, and having a length of N pictures;
calculating a first target number of bits, T, for encoding said super GOP according to the number of pictures in said super GOP, L×N, and an available capacity of a channel over which the video programs are transmitted;
wherein each super GOP comprises a plurality N of super frames, each super frame having L pictures at a common temporal reference point;
defining a respective complexity measure for each picture type in each $l^{th}$ program;

calculating a second target number of bits for encoding each $n^{th}$ super frame of pictures, where n=1, ..., N, according to said first target number of bits, T, and the complexity measure of each $l^{th}$ picture in the associated nth super frame, where l=1, ..., L;

calculating a third target number of bits for encoding each $l^{th}$ picture in the associated $n^{th}$ super frame according to said second target number of bits and the associated complexity measure, and a sum of the complexity measures for each picture in the associated $n^{th}$ super frame; and prior to encoding the $n^{th}$ super frame with the associated second target number of bits, at least one of the steps of:

(a) adjusting the associated second target number of bits, if necessary, to avoid falling below $R_{channel\,(bpf)} - B^e_{n-1}$, wherein:

$R_{channel(bpf)}$ is an average number of bits per picture transmitted over said channel; and $B^e_{n-1}$ is a fullness level of said buffer after the n-1$^{st}$ super frame has been encoded; and (b) adjusting the associated second target number of bits, if necessary, to avoid exceeding $R_{channel(bpf)} + B^e_{max} - B^e_{n-1}$;

wherein $B^e_{max}$ is a maximum capacity of said buffer.

4. A bit allocation method for digital video, comprising the steps of:

providing a plurality L of video programs at an encoder, each program having successive groups of pictures (GOPs);

wherein a buffer associated with said encoder receives encoded data from the video programs, and the video programs are transmitted over a channel to a decoder and stored in a buffer thereat;

each GOP having an associated number of pictures;

providing a super GOP comprising at least one GOP from each of said L video programs, and having a length of N pictures;

calculating a first target number of bits, T, for encoding said super GOP according to the number of pictures in said super GOP, L×N, and an available capacity of said channel;

wherein each super GOP comprises a plurality N of super frames, each super frame having L pictures at a common temporal reference point;

defining a respective complexity measure for each picture type in each $l^{th}$ program;

calculating a second target number of bits for encoding each $n^{th}$ super frame of pictures, where n=1, ..., N, according to said first target number of bits, T, and the complexity measure of each $l^{th}$ picture in the associated $n^{th}$ super frame, where l=1, ..., L;

calculating a third target number of bits for encoding each $l^{th}$ picture in the associated $n^{th}$ super frame according to said second target number of bits and the associated complexity measure, and a sum of the complexity measures for each picture in the associated $n^{th}$ super frame; and prior to encoding the $l^{th}$ picture in the $n^{th}$ super frame with the associated third target number of bits, at least one of the steps of:

(a) adjusting the associated third target number of bits, if necessary, to avoid falling below $$\sum_{n'=n}^{n+N'} R^c_{l,n'} - B^e_{l,n-1} - B^d_{max}$$

wherein:

$$\sum_{n'=n}^{n+N'} R^c_{l,n'}$$

is a sum of the number of bits transmitted for the $n^{th}$ through $(n+N')^{th}$ pictures for the $l^{th}$ video program;

N' is a decoding delay of said decoder;

$B^e_{l,n-1}$ is a fullness level of the encoder's buffer after the $l^{th}$ picture in the n-1$^{st}$ super frame has been encoded; and $B^d_{max}$ is a maximum capacity of the decoder's buffer; and (b) adjusting the associated third target number of bits, if necessary, to avoid exceeding $$\sum_{n'=n}^{n+N'} R^c_{l,n'} - B^e_{l,n-1}.$$

5. A bit allocation method for digital video, comprising the steps of:

providing a plurality L of video programs at an encoder, each program having successive groups of pictures (GOPs);

each GOP having an associated number of pictures;

providing a super GOP comprising at least one GOP from each of said L video programs, and having a length of N pictures;

calculating a first target number of bits, T, for encoding said super GOP according to the number of pictures in said super GOP, L×N, and an available capacity of a channel over which the video programs are transmitted;

wherein each super GOP comprises a plurality N of super frames, each super frame having L pictures at a common temporal reference point;

defining a respective complexity measure for each picture type in each $l^{th}$ program;

calculating a second target number of bits for encoding each $n^{th}$ super frame of pictures, where n=1, ..., N, according to said first target number of bits, T, and the complexity measure of each $l^{th}$ picture in the associated $n^{th}$ super frame, where l=1, ..., L;

calculating a third target number of bits for encoding each $l^{th}$ picture in the associated $n^{th}$ super frame according to said second target number of bits and the associated complexity measure, and a sum of the complexity measures for each picture in the associated $n^{th}$ super frame;

wherein $R_{min}$ is a minimum average number of bits for encoding N">1 pictures; and prior to encoding the $l^{th}$ picture in the $n^{th}$ super frame with the associated third target number of bits, at least one of the steps of:

(a) adjusting the associated third target number of bits, if necessary, to avoid falling below $$N''R_{\min} - \sum_{n'=n-N''}^{n-1} R_{l,n'}$$

wherein:

$$\sum_{n'=n-N''}^{n-1} R_{l,n'}$$

is a sum of the number of bits transmitted for the $(n-N'')^{th}$ through $(n-1)^{th}$ pictures for the $l^{th}$ video program; and (b) adjusting the associated third target number of bits, if necessary, to avoid exceeding $$N''R_{\max} - \sum_{n'=n-N''}^{n-1} R_{l,n'};$$

wherein $R_{max}$ is a maximum average number of bits for encoding $N''>1$ pictures.

6. A method for encoding at least one program of uncompressed video source data, and transcoding at least one other program of pre-compressed video source data, comprising the steps of:

partially decompressing the pre-compressed video source data from the at least one other program to obtain corresponding partially uncompressed video data;

allocating bits for encoding said uncompressed video source data from the at least one program according to a statistical multiplexing scheme; and allocating bits for transcoding said partially uncompressed video data from the at least one other program according to said statistical multiplexing scheme;

wherein said pre-compressed picture data is transcoded such that a bit rate of said pre-compressed picture data is different than a bit rate provided by the associated allocated bits.

7. A bit allocation apparatus for digital video, wherein a plurality L of video programs are provided at an encoder, each program has successive groups of pictures (GOPs), and each GOP has an associated number of pictures, comprising:

means for providing a super GOP comprising at least one GOP from each of said L video programs, and having a length of N pictures;

means for calculating a first target number of bits, T, for encoding said super GOP according to the number of pictures in said super GOP, L×N, and an available capacity of a channel over which the video programs are transmitted;

wherein each super GOP comprises a plurality N of super frames, each super frame having L pictures at a common temporal reference point;

means for defining a respective complexity measure for each picture type in each $l^{th}$ program;

means for calculating a second target number of bits for encoding each $n^{th}$ super frame of pictures, where n=1,..., N, according to said first target number of bits, T, and the complexity measure of each $l^{th}$ picture in the associated $n^{th}$ super frame, where means for calculating a third target number of bits for encoding each $l^{th}$ picture in the associated $n^{th}$ super frame according to said second target number of bits and the associated complexity measure, and a sum of the complexity measures for each picture in the associated $n^{th}$ super frame; and means for providing respective weighting factors, w, for the different video programs according to a relative priority thereof; wherein:

said third target number of bits for encoding each $l^{th}$ picture in the associated $n^{th}$ super frame is calculated according to the respective weighting factor of the associated $l^{th}$ video program.

8. A bit allocation apparatus for digital video, wherein a plurality L of video programs are provided at an encoder, each program has successive groups of pictures (GOPs), each GOP has an associated number of pictures, and at least one of said video programs comprises uncompressed video data, comprising:

means for processing pre-compressed picture data to obtain partially uncompressed data of at least a particular one of said plurality L of video programs;

means for providing a super GOP comprising at least one GOP from each of said L video programs, and having a length of N pictures;

means for calculating a first target number of bits, T, for encoding said super GOP according to the number of pictures in said super GOP, L×N, and an available capacity of a channel over which the video programs are transmitted;

wherein each super GOP comprises a plurality N of super frames, each super frame having L pictures at a common temporal reference point;

means for defining a respective complexity measure for each picture type in each $l^{th}$ program;

means for calculating a second target number of bits for encoding each $n^{th}$ super frame of pictures, where n=1, ..., N, according to said first target number of bits, T, and the complexity measure of each $l^{th}$ picture in the associated $n^{th}$ super frame, where l=1, ..., L; and means for calculating a third target number of bits for encoding each $l^{th}$ picture in the associated $n^{th}$ super frame according to said second target number of bits and the associated complexity measure, and a sum of the complexity measures for each picture in the associated $n^{th}$ super frame; wherein:

said pre-compressed picture data is transcoded such that a bit rate of said pre-compressed picture data is different than a bit rate provided by the associated third target number of bits.

9. A bit allocation apparatus for digital video, wherein a plurality L of video programs are provided at an encoder, each program has successive groups of pictures (GOPs), and each GOP has an associated number of pictures, and wherein a buffer associated with said encoder receives encoded data from the video programs, comprising:

means for providing a super GOP comprising at least one GOP from each of said L video programs, and having a length of N pictures;

means for calculating a first target number of bits, T, for encoding said super GOP according to the number of pictures in said super GOP, L×N, and an available capacity of a channel over which the video programs are transmitted;

wherein each super GOP comprises a plurality N of super frames, each super frame having L pictures at a common temporal reference point;

means for defining a respective complexity measure for each picture type in each $l^{th}$ program;

means for calculating a second target number of bits for encoding each $n^{th}$ super frame of pictures, where n=1, ..., N, according to said first target number of bits, T, and the complexity measure of each $l^{th}$ picture in the associated $n^{th}$ super frame, where l=1, ..., L;

means for calculating a third target number of bits for encoding each $l^{th}$ picture in the associated $n^{th}$ super frame according to said second target number of bits and the associated complexity measure, and a sum of the complexity measures for each picture in the associated $n^{th}$ super frame; and at least one of:
(a) means for adjusting the associated second target number of bits, if necessary, to avoid falling below $R_{channel(bpf)} - B^e_{n-1}$, prior to the $n^{th}$ super frame being encoded with the associated second target number of bits, wherein:

$R_{channel(bpf)}$ is an average number of bits per picture transmitted over said channel; and $B^e_{n-1}$ is a fullness level of said buffer after the n–$1^{st}$ super frame has been encoded; and (b) means for adjusting the associated second target number of bits, if necessary, to avoid exceeding $R_{channel(bpf)} + B^e_{max} - B^e_{n-1}$, prior to the $n^{th}$ super frame being encoded with the associated second target number of bits;

wherein $B^e_{max}$ is a maximum capacity of said buffer.

10. A bit allocation apparatus for digital video, wherein a plurality L of video programs are provided at an encoder, each program has successive groups of pictures (GOPs), and each GOP has an associated number of pictures, and wherein a buffer associated with said encoder receives encoded data from the video programs, and the video programs are transmitted over a channel to a decoder and stored in a buffer thereat, comprising:

means for providing a super GOP comprising at least one GOP from each of said L video programs, and having a length of N pictures;

means for calculating a first target number of bits, T, for encoding said super GOP according to the number of pictures in said super GOP, L×N, and an available capacity of said channel;

wherein each super GOP comprises a plurality N of super frames, each super frame having L pictures at a common temporal reference point;

means for defining a respective complexity measure for each picture type in each $l^{th}$ program;

means for calculating a second target number of bits for encoding each $n^{th}$ super frame of pictures, where n=1, ..., N, according to said first target number of bits, T, and the complexity measure of each $l^{th}$ picture in the associated $n^{th}$ super frame, where l=1, ..., L;

means for calculating a third target number of bits for encoding each $l^{th}$ picture in the associated $n^{th}$ super frame according to said second target number of bits and the associated complexity measure, and a sum of the complexity measures for each picture in the associated $n^{th}$ super frame; and at least one of:

(a) means for adjusting the associated third target number of bits, if necessary, to avoid falling below $$\sum_{n'=n}^{n+N'} R^c_{l,n'} - B^e_{l,n-1} - B^d_{max}$$

prior to the $l^{th}$ picture in the $n^{th}$ super frame being encoded with the associated third target number of bits, wherein:

$$\sum_{n'=n}^{n+N'} R^c_{l,n'}$$

is a sum of the number of bits transmitted for the $n^{th}$ through $(n+N')^{th}$ pictures for the $l^{th}$ video program;

N' is a decoding delay of said decoder;

$B^e_{l,n-1}$ is a fullness level of the encoder's buffer after the $l^{th}$ picture in the n–$1^{st}$ super frame has been encoded; and $B^d_{max}$ is a maximum capacity of the decoder's buffer; and (b) means for adjusting the associated third target number of bits, if necessary, to avoid exceeding $$\sum_{n'=n}^{n+N'} R^c_{l,n'} - B^e_{l,n-1}$$

prior to the $l^{th}$ picture in the $n^{th}$ super frame being encoded with the associated third target number of bits.

11. A bit allocation apparatus for digital video, wherein a plurality L of video programs are provided at an encoder, each program has successive groups of pictures (GOPs), and each GOP has an associated number of pictures, comprising:

means for providing a super GOP comprising at least one GOP from each of said L video programs, and having a length of N pictures;

means for calculating a first target number of bits, T, for encoding said super GOP according to the number of pictures in said super GOP, L×N, and an available capacity of a channel over which the video programs are transmitted;

wherein each super GOP comprises a plurality N of super frames, each super frame having L pictures at a common temporal reference point;

means for defining a respective complexity measure for each picture type in each $l^{th}$ program;

means for calculating a second target number of bits for encoding each $n^{th}$ super frame of pictures, where n=1, ..., N, according to said first target number of bits, T, and the complexity measure of each $l^{th}$ picture in the associated $n^{th}$ super frame, where l=1, ..., L;

means for calculating a third target number of bits for encoding each $l^{th}$ picture in the associated $n^{th}$ super frame according to said second target number of bits and the associated complexity measure, and a sum of the complexity measures for each picture in the associated $n^{th}$ super frame;

wherein $R_{min}$ is a minimum average number of bits for encoding N''>1 pictures; and at least one of:
(a) means for adjusting the associated third target number of bits, if necessary, to avoid falling below $$N'' R_{min} - \sum_{n'=n-N''}^{n-1} R_{l,n'}$$

prior to the $l^{th}$ picture in the $n^{th}$ super frame being encoded with the associated third target number of bits, wherein:

$$\sum_{n'=n-N''}^{n-1} R_{l,n'}$$

is a sum of the number of bits transmitted for the $(n-N'')^{th}$ through $(n-1)^{th}$ pictures for the $l^{th}$ video program; and
    (b) means for adjusting the associated third target number of bits, if necessary, to avoid exceeding $$N'' R_{max} - \sum_{n'=n-N''}^{n-1} R_{l,n'}$$

prior to the $l^{th}$ picture in the $n^{th}$ super frame being encoded with the associated third target number of bits;
    wherein $R_{max}$ is a maximum average number of bits for encoding $N''>1$ pictures.

12. An apparatus for encoding at least one program of uncompressed video source data, and transcoding at least one other program of pre-compressed video source data, comprising:
    means for partially decompressing the pre-compressed video source data from the at least one other program to obtain corresponding partially uncompressed video data;
    means for allocating bits for encoding said uncompressed video source data from the at least one program according to a statistical multiplexing scheme; and
    means for allocating bits for transcoding said partially uncompressed video data from the at least one other program according to said statistical multiplexing scheme;
    wherein said pre-compressed picture data is transcoded such that a bit rate of said pre-compressed picture data is different than a bit rate provided by the associated allocated bits.

13. A bit allocation apparatus for digital video, wherein a plurality L of video programs are provided at an encoder, each program has successive groups of pictures (GOPs), and each GOP has an associated number of pictures, comprising:
    a rate control processor;
    a super GOP processor, a super frame processor, a frame processor, and a complexity processor, each of which is associated with said rate control processor; wherein:
    said rate control processor is responsive to a signal defining a super GOP comprising at least one GOP from each of said L video programs, and having a length of N pictures;
    said super GOP processor is adapted to calculate a first target number of bits, T, for encoding said super GOP according to the number of pictures in said super GOP, L×N, and an available capacity of a channel over which the video programs are transmitted;
    each super GOP comprises a plurality N of super frames, each super frame having L pictures at a common temporal reference point;
    said complexity processor is adapted to calculate a respective complexity measure for each picture type in each $l^{th}$ program;
    said super frame processor is adapted to calculate a second target number of bits for encoding each $n^{th}$ super frame of pictures, where n=1, ..., N, according to said first target number of bits, T, and the associated complexity measure of each $l^{th}$ picture in the associated $n^{th}$ super frame, where l=1, ..., L;
    said frame processor is adapted to calculate a third target number of bits for encoding each $l^{th}$ picture in the associated $n^{th}$ super frame according to said second target number of bits and the associated complexity, and a sum of the complexity measures for each picture in the associated $n^{th}$ super frame;
    said rate control processor provides respective weighting factors, w, for the different video programs according to a relative priority thereof; and
    said frame processor is adapted to calculate said third target number of bits for encoding each $l^{th}$ picture in the associated $n^{th}$ super frame according to the respective weighting factor of the associated $l^{th}$ video program.

14. A bit allocation apparatus for digital video, wherein a plurality L of video programs are provided at an encoder, each program has successive groups of pictures (GOPs), each GOP has an associated number of pictures, and at least one of said video programs comprises uncompressed video data, comprising:
    a transcoding processor for processing pre-compressed picture data to obtain partially uncompressed data of at least a particular one of said plurality L of video programs;
    a rate control processor;
    a super GOP processor, a super frame processor, a frame processor, and a complexity processor, each of which is associated with said rate control processor; wherein:
    said rate control processor is responsive to a signal defining a super GOP comprising at least one GOP from each of said L video programs, and having a length of N pictures;
    said super GOP processor is adapted to calculate a first target number of bits, T, for encoding said super GOP according to the number of pictures in said super GOP, L×N, and an available capacity of a channel over which the video programs are transmitted;
    each super GOP comprises a plurality N of super frames, each super frame having L pictures at a common temporal reference point;
    said complexity processor is adapted to calculate a respective complexity measure for each picture type in each $l^{th}$ program;
    said super frame processor is adapted to calculate a second target number of bits for encoding each $n^{th}$ super frame of pictures, where n=1, ..., N, according to said first target number of bits, T, and the associated complexity measure of each $l^{th}$ picture in the associated nt super frame, where l=1, ..., L;
    said frame processor is adapted to calculate a third target number of bits for encoding each $l^{th}$ picture in the associated $n^{th}$ super frame according to said second target number of bits and the associated complexity, and a sum of the complexity measures for each picture in the associated $n^{th}$ super frame; and
    said pre-compressed picture data is transcoded such that a bit rate of said pre-compressed picture data is different than a bit rate provided by the associated third target number of bits.

15. A bit allocation apparatus for digital video, wherein a plurality L of video programs are provided at an encoder, each program has successive groups of pictures (GOPs), and each GOP has an associated number of pictures, comprising:
    a rate control processor;

a super GOP processor, a super frame processor, a frame processor, and a complexity processor, each of which is associated with said rate control processor; wherein:

said rate control processor is responsive to a signal defining a super GOP comprising at least one GOP from each of said L video programs, and having a length of N pictures;

said super GOP processor is adapted to calculate a first target number of bits, T, for encoding said super GOP according to the number of pictures in said super GOP, L×N, and an available capacity of a channel over which the video programs are transmitted;

each super GOP comprises a plurality N of super frames, each super frame having L pictures at a common temporal reference point;

said complexity processor is adapted to calculate a respective complexity measure for each picture type in each $_1$th program;

said super frame processor is adapted to calculate a second target number of bits for encoding each $n^{th}$ super frame of pictures, where n=1, . . . , N, according to said first target number of bits, T, and the associated complexity measure of each $l^{th}$ picture in the associated $n^{th}$ super frame, where l=1, . . . , L;

said frame processor is adapted to calculate a third target number of bits for encoding each $l^{th}$ picture in the associated $n^{th}$ super frame according to said second target number of bits and the associated complexity, and a sum of the complexity measures for each picture in the associated $n^{th}$ super frame;

a buffer associated with said encoder receives encoded data from the video programs;

said super frame processor receives a signal indicative of a fullness level of said buffer;

wherein at least one of:

(a) said super frame processor is adapted to adjust the associated second target number of bits, if necessary, to avoid falling below $R_{channel(bpf)} - B^e_{n-1}$ prior to the $n^{th}$ super frame being encoded with the associated second target number of bits;

$R_{channel(bpf)}$ is an average number of bits per picture transmitted over said channel; and $B^e_{n-1}$ is the fullness level of said buffer after the $n-1^{st}$ super frame has been encoded; and (b) said super frame processor is adapted to adjust the associated second target number of bits, if necessary, to avoid exceeding $R_{channel(bpf)} + B^e_{max} - B^e_{n-1}$ prior to the $n^{th}$ super frame being encoded with the associated second target number of bits;

wherein $B^e_{max}$ is a maximum capacity of said buffer.

16. A bit allocation apparatus for digital video, wherein a plurality L of video programs are provided at an encoder, each program has successive groups of pictures (GOPs), and each GOP has an associated number of pictures, comprising:

a rate control processor;

a super GOP processor, a super frame processor, a frame processor, and a complexity processor, each of which is associated with said rate control processor; wherein:

said rate control processor is responsive to a signal defining a super GOP comprising at least one GOP from each of said L video programs, and having a length of N pictures;

said super GOP processor is adapted to calculate a first target number of bits, T, for encoding said super GOP according to the number of pictures in said super GOP, L×N, and an available capacity of a channel over which the video programs are transmitted;

each super GOP comprises a plurality N of super frames, each super frame having L pictures at a common temporal reference point;

said complexity processor is adapted to calculate a respective complexity measure for each picture type in each $l^{th}$ program;

said super frame processor is adapted to calculate a second target number of bits for encoding each $n^{th}$ super frame of pictures, where n=1, . . . , N, according to said first target number of bits, T, and the associated complexity measure of each $l^{th}$ picture in the associated $n^{th}$ super frame, where l=1, . . . , L;

said frame processor is adapted to calculate a third target number of bits for encoding each $l^{th}$ picture in the associated $n^{th}$ super frame according to said second target number of bits and the associated complexity, and a sum of the complexity measures for each picture in the associated $n^{th}$ super frame;

a buffer associated with said encoder receives encoded data from the video programs, and the video programs are transmitted over said channel to a decoder and stored in a buffer thereat;

said frame processor receives a signal indicative of a fullness level of the encoder buffer;

wherein at least one of:

(a) said frame processor is adapted to adjust the associated third target number of bits, if necessary, to avoid falling below $$\sum_{n'=n}^{n+N'} R^c_{l,n'} - B^e_{l,n-1} - B^d_{max}$$

prior to the $l^{th}$ picture in the $n^{th}$ super frame being encoded with the associated third target number of bits;

$$\sum_{n'=n}^{n+N'} R^c_{l,n'}$$

is a sum of the number of bits transmitted for the $n^{th}$ through $(n+N')^{th}$ pictures for the $l^{th}$ video program;

N' is a decoding delay of said decoder;

$B^e_{1,n-1}$ is a fullness level of the encoder's buffer after the $l^{th}$ picture in the $n-1^{st}$ super frame has been encoded; and $B^d_{max}$ is a maximum capacity of the decoder's buffer; and (b) said frame processor is adapted to adjust the associated third target number of bits, if necessary, to avoid exceeding $$\sum_{n'=n}^{n+N'} R^c_{l,n'} - B^e_{l,n-1},$$

prior to the $l^{th}$ picture in the $n^{th}$ super frame being encoded with the associated third target number of bits.

17. A bit allocation apparatus for digital video, wherein a plurality L of video programs are provided at an encoder, each program has successive groups of pictures (GOPs), and each GOP has an associated number of pictures, comprising:

a rate control processor;

a super GOP processor, a super frame processor, a frame processor, and a complexity processor, each of which is associated with said rate control processor; wherein:

said rate control processor is responsive to a signal defining a super GOP comprising at least one GOP from each of said L video programs, and having a length of N pictures;

said super GOP processor is adapted to calculate a first target number of bits, T, for encoding said super GOP according to the number of pictures in said super GOP, L×N, and an available capacity of a channel over which the video programs are transmitted;

each super GOP comprises a plurality N of super frames, each super frame having L pictures at a common temporal reference point;

said complexity processor is adapted to calculate a respective complexity measure for each picture type in each $l^{th}$ program;

said super frame processor is adapted to calculate a second target number of bits for encoding each $n^{th}$ super frame of pictures, where n=1, . . . , N, according to said first target number of bits, T, and the associated complexity measure of each $l^{th}$ picture in the associated $n^{th}$ super frame, where l=1, . . . , L;

said frame processor is adapted to calculate a third target number of bits for encoding each $l^{th}$ picture in the associated $n^{th}$ super frame according to said second target number of bits and the associated complexity, and a sum of the complexity measures for each picture in the associated $n^{th}$ super frame;

$R_{min}$ is a minimum average number of bits for encoding N">1 pictures;

wherein at least one of:

(a) said frame processor is adapted to adjust the associated third target number of bits, if necessary, to avoid falling below $$N'' R_{\min} - \sum_{n'=n-N''}^{n-1} R_{l,n'}$$

prior to the $l^{th}$ picture in the $n^{th}$ super frame being encoded with the associated third target number of bits; and $$\sum_{n'=n-N''}^{n-1} R_{l,n'}$$

is a sum of the number of bits transmitted for the $(n-N'')^{th}$ through $(n-1)^{th}$ pictures for the $l^{th}$ video program; and (b) said frame processor is adapted to adjust the associated third target number of bits, if necessary, to avoid exceeding $$N'' R_{\max} - \sum_{n'=n-N''}^{n-1} R_{l,n'}$$

prior to the $l^{th}$ picture in the $n^{th}$ super frame being encoded with the associated third target number of bits;

wherein $R_{max}$ is a maximum average number of bits for encoding N">1 pictures.

18. An apparatus for encoding at least one program of uncompressed video source data, and transcoding at least one other program of pre-compressed video source data, comprising:

an encoder;

a transcoder;

a rate control processor associated with said encoder and transcoder; wherein:

said transcoder partially decompresses the pre-compressed video source data from the at least one other program to obtain corresponding partially uncompressed video data;

said rate control processor allocates bits to said encoder for encoding said uncompressed video source data from the at least one program according to a statistical multiplexing scheme;

said rate control processor allocates bits to said transcoder for transcoding said partially uncompressed video data from the at least one other program according to said statistical multiplexing scheme; and said pre-compressed picture data is transcoded such that a bit rate of said pre-compressed picture data is different than a bit rate provided by the associated allocated bits.

* * * * *